US006943531B2

(12) United States Patent
Fukaya

(10) Patent No.: US 6,943,531 B2
(45) Date of Patent: Sep. 13, 2005

(54) PORTABLE POWER SUPPLY INCORPORATING A GENERATOR DRIVEN BY AN ENGINE

(75) Inventor: Mitsuo Fukaya, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 189 days.

(21) Appl. No.: 10/393,683

(22) Filed: Mar. 20, 2003

(65) Prior Publication Data

US 2004/0008009 A1 Jan. 15, 2004

(30) Foreign Application Priority Data

Mar. 20, 2002 (JP) ....................................... 2002-078944
Mar. 26, 2002 (JP) ....................................... 2002-086027
Mar. 29, 2002 (JP) ....................................... 2002-094655
Apr. 22, 2002 (JP) ....................................... 2002-118763

(51) Int. Cl.[7] .......................... F02N 11/00; F02N 11/04; H02P 9/04; H02K 29/06

(52) U.S. Cl. ............................ 322/10; 322/14; 307/46; 307/67

(58) Field of Search ....................... 322/10, 14; 307/46, 307/48, 64, 67, 105

(56) References Cited

U.S. PATENT DOCUMENTS 4,119,861 A * 10/1978 Gocho ......................... 290/13
4,465,943 A * 8/1984 Risberg ....................... 307/67
4,680,529 A * 7/1987 Komurasaki et al. ......... 322/28
4,689,545 A * 8/1987 Komurasaki et al. ......... 322/28
4,786,852 A * 11/1988 Cook .......................... 322/10
4,967,334 A * 10/1990 Cook et al. ................... 363/34
5,013,929 A * 5/1991 Dhyanchand ................ 290/31
5,015,941 A * 5/1991 Dhyanchand ................ 322/10
5,068,590 A * 11/1991 Glennon et al. ............. 322/10
5,172,009 A * 12/1992 Mohan ........................ 307/46
5,281,905 A * 1/1994 Dhyanchand et al. ......... 322/32
5,334,877 A * 8/1994 Mohan et al. ................ 307/46
5,343,079 A * 8/1994 Mohan et al. .............. 307/105
5,493,200 A * 2/1996 Rozman et al. ............... 322/10
5,559,686 A * 9/1996 Patel et al. ................... 363/43
5,581,168 A * 12/1996 Rozman et al. ............. 318/723
5,594,322 A * 1/1997 Rozman et al. ............... 322/10
5,625,539 A * 4/1997 Nakata et al. ................ 363/17
5,650,713 A * 7/1997 Takeuchi et al. .............. 322/16
5,747,971 A * 5/1998 Rozman et al. ............... 322/10
5,767,591 A * 6/1998 Pinkerton .................... 307/64
5,856,712 A * 1/1999 Suzuki et al. ................. 307/64
6,134,124 A * 10/2000 Jungreis et al. ............... 363/34
6,157,168 A * 12/2000 Malik ......................... 320/128
6,369,461 B1 * 4/2002 Jungreis et al. ............... 307/46
6,384,559 B2 * 5/2002 Egami ........................ 318/500

(Continued)

FOREIGN PATENT DOCUMENTS

| | | |
|---|---|---|
| JP | 5-18285 | 1/1993 |
| JP | 2934675 | 4/1999 |
| JP | 2000-278998 | 10/2000 |

*Primary Examiner*—Nicholas Ponomarenko
*Assistant Examiner*—Pedro J. Cuevas
(74) *Attorney, Agent, or Firm*—Knobbe, Martens, Olson & Bear LLP

(57) ABSTRACT

A portable power supply includes an engine-driven generator that generates a first AC power. A rectifier rectifies the first AC power to a first DC power. A DC/DC converter converts a second DC power from a storage unit to a third DC power. A controller selectively enables one or both of the rectifier and the DC/DC converter to provide one or both of the first DC power and the third DC power to the input of an inverter. The inverter converts the DC power at its input to a second AC power. Alternatively, the power supply advantageously includes a second generator and a second rectifier. The outputs of the two rectifiers are summed and the sum of the two outputs is provided as an input the inverter to extend the range over which a constant second AC power can be provided.

27 Claims, 25 Drawing Sheets

U.S. PATENT DOCUMENTS 6,487,096 B1 * 11/2002 Gilbreth et al. ............... 363/35
6,605,928 B2 * 8/2003 Gupta et al. .................. 322/10
6,703,719 B1 * 3/2004 McConnell .................. 290/52
6,737,762 B2 * 5/2004 Koenig ........................ 307/48
6,819,007 B2 * 11/2004 Fukaya ..................... 290/40 C

* cited by examiner

PORTABLE POWER SUPPLY INCORPORATING A GENERATOR DRIVEN BY AN ENGINE

RELATED APPLICATIONS

The present application claims priority under 35 U.S.C. § 119 to Japanese Patent Application No. 2002-078944 filed on Mar. 20, 2002, Japanese Patent Application No. 2002-086027 filed on Mar. 26, 2002, and is based on Japanese Patent Application No. 2002-094655 filed on Mar. 29, 2002, and Japanese Patent Application No. 2002-118763 filed on Apr. 22, 2002, the disclosures of which are hereby incorporated by reference in their entirety.

BACKGROUND OF THE INVENTION

1. Field of the Invention

The present invention generally relates to a portable power supply. More particularly, the present invention relates to a portable power supply that incorporates a generator driven by an engine.

2. Description of the Related Art

Portable power supplies, such as electrical generators that incorporate a generator driven by an engine, are popular for many uses. In an exemplary portable power supply, the engine-driven generator generates a first AC power. The portable power supply includes a rectifier that rectifies the first AC power to produce a DC power. The portable power supply includes an inverter that converts the DC power to a second AC power. The second AC power has a quality that is superior to the quality of the first AC power directly from the generator.

Although a portable power supply having an engine-driven generator is quite convenient and useful, the engine can produce noise that bothers an operator of the power supply or that bothers persons around the power supply. In addition, the power that the engine-driven generator supplies has a magnitude that depends on a magnitude of the output from the engine. Accordingly, portable engine-driven generators may only be able to provide power to relatively small loads.

SUMMARY OF THE INVENTION

Features of the present invention improve conventional engine-driven generators in portable power supplies, and, in particular, enable an improved generator to operate quietly and to provide power to relatively large loads.

Exemplary applications and configurations of the improved engine-driven generator are discussed below. It should be noted that the following discussion relates to several distinct features of the present invention, and not all of the features need to be present in any single embodiment of the present invention. Thus, some of the features may be used with other features in some applications while other applications will only reflect one of the features. Moreover, the features, aspects and advantages can be applied to portable engine-driven generators in the narrow sense, but can be also applied to other power supplies, as will become apparent to those of ordinary skill in the art.

Accordingly, one aspect of the invention involves a power supply that comprises an internal combustion engine. The engine drives a generator that generates a first AC power. A rectifier rectifies the first AC power to produce a first DC power. An inverter converts the first DC power to a second AC power. An electrical energy storage device accumulates electrical energy to supply a second DC power. A DC-to-DC converter converts the second DC power to a third DC power. The third DC power is selectively provided as an additional input to the inverter. When the third DC power is provided as an input to the inverter, the inverter converts the third DC power to the second AC power. A controller controls at least the rectifier and the DC/DC converter. The controller selectively enables one of the rectifier and the DC/DC converter to provide either the first DC power or the third DC power as the input power to the inverter. The controller also selectively enables both the rectifier and the DC/DC converter to provide both the first DC power and the third DC power as input powers to the inverter.

Preferably, the controller monitors the second AC power and enables the rectifier and the DC/DC converter to provide the first and third DC powers to the inverter when the second AC power is greater than a preset magnitude. In particular embodiments, the controller monitors the current of the second AC power. For example, the controller monitors an increase rate of the current and enables the rectifier and the DC/DC converter to provide the first and third DC powers to the inverter when the increase rate of the current is greater than a preset increase rate. The controller may additionally monitor a voltage of the first DC power and enable the rectifier and the DC/DC converter to provide the first and third DC powers when the current is greater than a preset magnitude and the voltage is less than a preset voltage.

Also preferably, the power supply may additionally comprise a switch to select either a first control mode or a second control mode. When the switch is positioned in the first control mode, one of the rectifier and the DC/DC converter provides one of the first and third DC powers, respectively, to the inverter. When the switch is positioned in the second control mode, both of the rectifier and the DC/DC converter provide respective DC powers to the inverter. The power supply advantageously comprises a second switch to select either the rectifier or the DC/DC converter under the first control mode.

In certain preferred embodiments, the power supply additionally comprises a switch to select either a first engine operating mode or second engine operating mode. The controller monitors the second AC power and controls the engine such that an engine speed changes along with a change of the second AC power when the switch is positioned in the first engine operating mode, and controls the engine such that the engine speed is generally constant when the switch is positioned in the second engine operating mode. Preferably, the controller incorporates at least one control map of engine speed versus current of the second AC power. The controller monitors the current of the second AC power and controls the engine speed in accordance with a change of the current using the said control map.

In alternative preferred embodiments, the generator or the engine incorporates a charge coil that charges the electrical storage device. The electrical storage device advantageously includes a battery. Alternatively, the electrical storage device advantageously includes a double-layered capacitor.

In certain alternative preferred embodiments, the power supply additionally comprises at least a second generator. Each generator generates a respective first AC power, and the AC powers are different in magnitude with respect to each other. The power supply additionally comprises at least a second rectifier, wherein each rectifier receives a respective one of the first AC powers and produces a respective rectified DC power at a respective rectifier output. The rectifier outputs are connected in series to provide the first DC power as a sum of the respective rectified DC powers.

In particular embodiments, the power supply additionally comprises a housing at least enclosing the engine and the generator. A temperature sensor detects a temperature inside of the housing. The controller controls a speed of the engine based upon an output signal of the temperature sensor such that the controller increases engine speed when the temperature increases.

In accordance with another aspect of the present invention, a control method is provided for a power supply. The control method comprises monitoring an AC power from an inverter, determining whether the AC power exceeds a preset magnitude, and enabling a rectifier and a converter to cause both the rectifier and the converter to output respective DC powers to the input of the inverter when the AC power from the inverter exceeds the preset magnitude.

In preferred embodiments of the control method, the method additionally comprises determining whether a switch is placed in a first position corresponding to a first control mode or placed in a second position corresponding to a second control mode. The method enables one of the rectifier and the DC/DC converter to provide respective DC power to the inverter if the switch is placed in the first position. The method enables the rectifier and the DC/DC converter to provide respective DC powers to the inverter if the switch is placed in the second position.

In certain preferred embodiments, the rectifier rectifies a second AC power generated by a generator driven by an engine, and the method further comprises determining whether a second switch is placed in a first position corresponding to a first engine operating mode or the second switch is placed in a second position corresponding to a second engine operating mode. The method controls the engine such that an engine speed changes along with a change of the first AC power if the second switch is placed in the first position. The method controls the engine such that the engine speed is generally constant if the second switch is placed in the second position.

In accordance with another aspect of the present invention, an engine-driven power supply comprises an engine that operates at a variable engine speed and that produces a power output. A first generator coupled to the power output of the engine generates a first AC voltage that has a first magnitude characteristic in response to variations in the engine speed. A second generator coupled to the power output of the engine generates a second AC voltage that has a second magnitude characteristic in response to variations in the engine speed. A first rectifier has an input that receives the first AC voltage and has an output that provides a first DC voltage. A second rectifier has an input that receives the second AC voltage and has an output that provides a second DC voltage. The output of the second rectifier connected in series with the output of the first rectifier to superimpose the first DC voltage and the second DC to provide a composite DC voltage having a composite magnitude characteristic in response to engine speed. A DC-to-AC conversion unit has an input that receives the composite DC voltage and has an output that generates an AC output voltage responsive to the magnitude of the composite DC voltage.

In accordance with particularly preferred embodiments, the power supply further comprises a voltage stabilization circuit that stabilizes at least the first DC voltage such that the composite DC voltage increases only to a selected magnitude as the engine speed increases to a selected engine speed, and such that the composite DC voltage does not increase as the engine speed increases above the selected engine speed. The power supply further comprises a filter circuit coupled to the output of the DC-to-AC conversion unit. The filter circuit reduces harmonic components from the third AC voltage. The filter circuit generates a control voltage responsive to the third AC voltage. A control circuit is coupled to receive the control voltage from the filter circuit. The control circuit controls the voltage stabilization circuit in response to the control voltage. In particularly preferred embodiments, the first AC voltage generated by the first generator is greater than the second AC voltage generated by the second generator, and the voltage stabilization circuit stabilizes the first DC voltage provided by the first rectifier.

BRIEF DESCRIPTION OF THE DRAWINGS

The foregoing and other features, aspects and advantages of the present invention are described in detail below in connection with the accompanying drawings. The drawings comprise 26 figures in which.

DETAILED DESCRIPTION OF THE PREFERRED EMBODIMENTS

Overall Structure of Engine-Driven Generator

Figure 1:
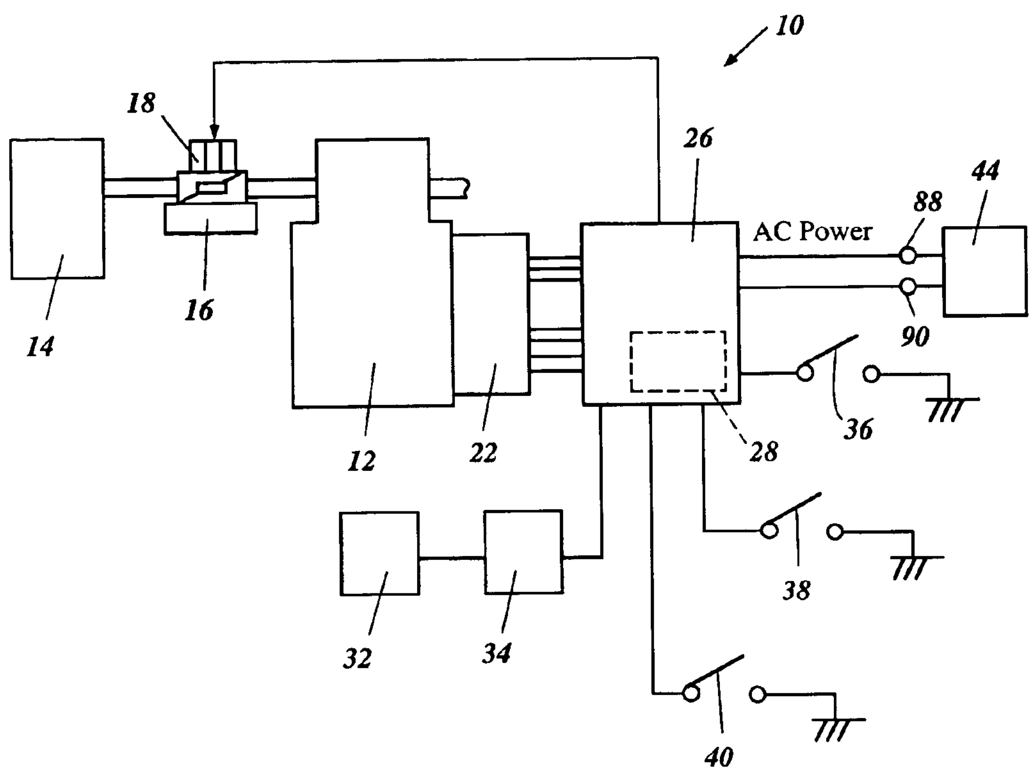
FIG. 1 is a diagrammatic view of an engine-driven generator that can be arranged and configured in accordance with certain features, aspects and advantages of the present invention.

An overall structure of an engine-driven generator 10 that can be used with various features, aspects and advantages of the present invention is illustrated in FIG. 1. The illustrated engine-driven generator 10 generally comprises an internal combustion engine 12. The engine 12 can comprise one or more cylinders that form combustion chambers. The combustion chambers and cylinders may have any orientation (e.g., in-line, V configuration, opposed, vertical or horizontal). The engine 12 can operate in accordance with any combustion principle (e.g., four-cycle, two-cycle, rotary, or the like).

The engine 12 preferably comprises an air intake system, a fuel supply system, an ignition system and an exhaust system. A plenum chamber 14 draws air into the intake system. The plenum chamber 14 advantageously smoothes the air and reduces intake noise. A carburetor 16 is included as a portion of the intake system and as a portion of the fuel supply system. The air is introduced into combustion chambers of the engine 12 through the carburetor 16. The carburetor 16 incorporates a throttle valve that regulates an amount of the air. For example, the amount of air introduced to the combustion chamber changes in response to a position of the throttle valve (e.g., an opening degree thereof). Fuel is drawn into the intake system at the carburetor 14, and an amount of fuel also is regulated by the carburetor 16 so as to be generally in proportion to the air amount. Preferably, a stepping motor 18 proximate to the carburetor 16 actuates the throttle valve. The air and the fuel are mixed together within the combustion chambers to form an air/fuel charge. Normally, a greater opening degree of the throttle valve results in a greater air/fuel charge and a higher engine speed.

The air/fuel charge is fired by the ignition system at a proper time, and the engine 12 produces power when the air/fuel charge burns in the combustion chambers. The power rotates an output shaft or crankshaft of the engine 12. Burnt charges (e.g., exhaust gases) are routed to an external location of the engine 12 through the exhaust system.

An AC generator 22 is positioned proximate to the engine 12 to be driven by the engine 12. A shaft of the generator 22 is coupled with the output shaft of the engine 12 and rotates when the engine output shaft rotates to cause the AC generator 22 to generate AC power. The AC power produced by the AC generator 22 varies with engine speed.

A power converting unit 26 is electrically coupled to the generator 22 to convert the AC power from the generator 22 to a high quality AC power. The illustrated power converting unit 26 incorporates a controller 28 to control an output of the power converting unit 26. The controller 28 also controls the stepping motor 18 coupled to the throttle valve. In some arrangements, the controller 28 is not located in the power converting unit 26.

In the illustrated arrangement, the engine-driven generator 10 also comprises an electrical energy storage unit (electrical energy accumulator) 32 and a DC-to-DC converter 34. The energy storage unit 32 preferably comprises a plurality of batteries 35 that are connected in series to provide a DC voltage that is the sum of the DC voltages of the batteries 35.

The DC/DC converter 34 comprises an inverter (e.g., a DC-to-AC or DC/AC converter) and a rectifier to boost the DC voltage from the energy storage unit 32 to a higher DC voltage. The illustrated DC/DC converter 34 is electrically coupled to the power converting unit 26.

Figure 2:
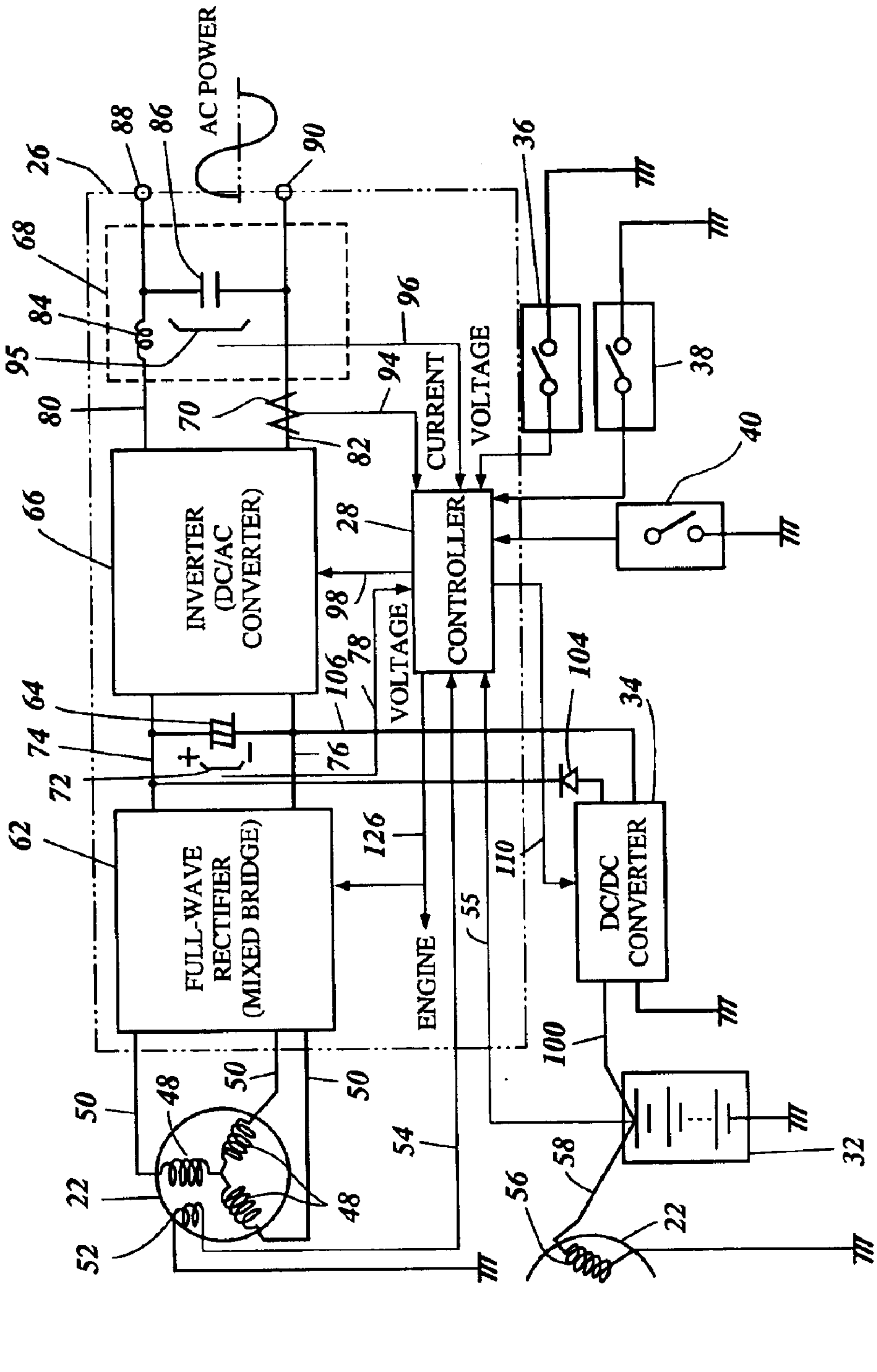
FIG. 2 is a circuit diagram of the engine-driven generator of FIG. 1.

The controller 28 coordinates the use of the output of the generator 22 and the output of the DC/DC converter 34 in addition to controlling the output of the power converting unit 26. Preferably, the controller 28 comprises at least a central processing unit (CPU) and a memory or storage. As schematically illustrated in FIG. 1 and FIG. 2, first switch 36, a second switch 38 and a third switch 40 are electrically connected to the power converting unit 26. The first switch 36 is a normal/economy mode selection switch. The second switch 38 is a normal/power-up mode selection switch. The third switch 40 is a source selection switch. An operator is able to manually operate the switches 36, 38, 40 to provide command signals to the controller 28 to coordinate the two power sources in accordance with the functions described below.

The power converting unit 26 preferably produces AC power as its output. A load device 44 is coupled to the output of the power converting unit 26 to receive and use the AC power.

As shown in FIG. 2, the generator 22 preferably is a three-phase AC generator that comprises three generator coils 48 located at a stator of the generator 22. A rotor rotates with when the engine output shaft rotates. When the rotor is rotated by the engine 12, the generator coils 48 generate three AC currents that are phased at 120 degrees with respect to each other. The generated AC currents are supplied to the power converting unit 26 via respective power lines 50. The three current phases from the generator 22 comprise a first AC power.

The illustrated generator 22 also includes a controller activating coil 52 that supplies activating power to the controller 28 via a line 54 whenever the generator 22 is driven by the engine 12. The controller 28 advantageously includes a built-in rectifier (not shown) to rectify the activating power from the coil 52 to provide DC power for the controller. The energy storage unit 32 also can supply the activating power to the controller 28 via a line 55 when the generator 22 is not being driven by the engine 12.

The generator 22 preferably includes a charge coil 56 that supplies a charging current to the energy storage unit 32 via a power line 58. In the illustrated arrangement, only a half cycle of the charging current is supplied to the energy storage unit 32. Alternatively, a full-wave rectifier can be interposed in the power line 58 to apply the full cycle of the charging current (e.g., apply full-wave power) from the charge coil 56 to the energy storage unit 32. Also, the charge coil can be included in a generator located in the engine 12 that primarily generates power for engine components such as the ignition system.

The power converting unit 26 preferably comprises a full-wave rectifier 62, an electrolytic capacitor 64, an inverter or DC/AC converter 66, a harmonics filter 68, a current sensor 70 and a voltage sensor 72. The illustrated power converting unit 26 also includes the controller 28.

The full-wave rectifier 62 preferably is a mixed bridge circuit that comprises diodes and thyristers. The rectifier 62 can advantageously incorporate a voltage stabilization circuit (discussed below). The power lines 50 from the generator coils 48 are connected to input terminals of the rectifier 62. The full-wave rectifier 62 rectifies the AC power from the coils 48 of the generator 22 to convert the AC power to DC power.

A power line 74 connects an output terminal of the rectifier 62 to an anode of the electrolytic capacitor 64. A ground line 76 connects a ground terminal of the rectifier 62 to a cathode of the electrolytic capacitor 64. Rather than the illustrated direct connection, the ground terminal of the rectifier 62 and the cathode of the electrolytic capacitor 64 can be advantageously interconnected by connecting each element to a common ground. The electrolytic capacitor 64 smoothes the output of the rectifier 62.

The power line 74 further connects the anode of the electrolytic capacitor 64 to an input terminal of the inverter 66. The ground line 76 connects the cathode of the electrolytic capacitor 64 to a ground terminal of the inverter 66. Alternatively, the ground terminal of the inverter 66 may be connected to the common ground.

A DC voltage of the output power from the rectifier 62 is detected or monitored by the voltage sensor 72 and is provided to the controller 28 via a line 78. Preferably, the voltage across the electrolytic capacitor 64 is detected by the voltage sensor 72 as the DC voltage.

The inverter 66 converts the DC power from the rectifier 62 to a second AC power. The converted second AC power is superior in quality than the AC power generated by the generator 22. For example, the converted AC power can have any frequency. Unlike the frequency of the first AC power from the generator 22, the frequency of the second AC power does not depend upon the speed of the engine 12 and can be maintained at a substantially constant value.

Two power lines 80, 82 extend from output terminals of the inverter 66 and are connected to the input terminals of the harmonics filter 68. The harmonics filter 68 preferably is a filter circuit that comprises an inductance coil 84 positioned in one of the power lines 80, 82 and that comprises a capacitor 86 positioned between the power lines 80, 82. The illustrated inductance coil 84 is positioned in the power line 80. A proper inductance of the coil and a proper capacitance of the capacitor 86 are selected to remove higher harmonics from the AC power. A load device can be coupled to output terminals 88, 90 of the filter 68, which also are output terminals of the power converting unit 26. The AC power converted by the inverter 66 is supplied to the load device from the output terminals 88, 90 after the higher harmonics are removed.

The current sensor 70 preferably is positioned in the power line 82 to detect or monitor an AC output current from the inverter 82. The output current also is a load current. A rated current of this load current in the illustrated arrangement is 23 amperes, for example. The detected AC current is delivered to the controller 28 via a line 94 and is used in several controls described below. An output DC voltage also is detected or monitored by a voltage sensor 95 and is provided to the controller 28 via line 96. Preferably, a voltage across the capacitor 86 is detected by the voltage sensor 95 as the output voltage and is used in feedback controls of the inverter 66 such that the output voltage is kept in a preset range around a desired voltage. This feedback control is provided from the controller 28 to the inverter 66 via a line 98.

Figure 4:
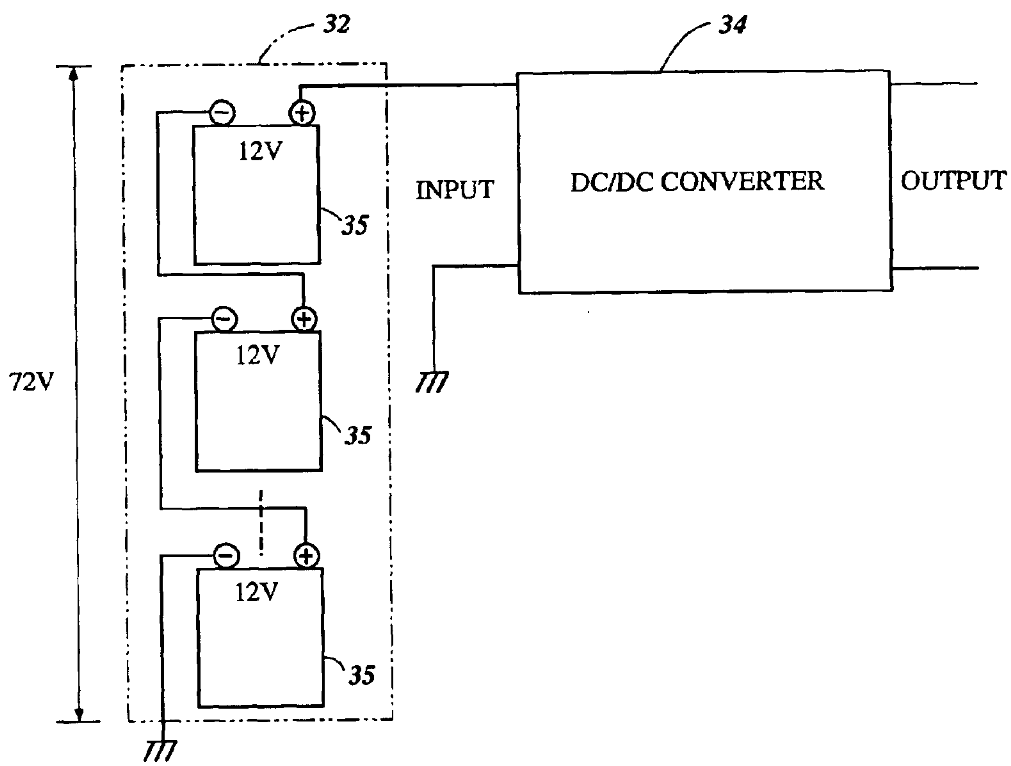
FIG. 4 is a circuit diagram of a portion of the engine-driven generator that includes a DC/DC converter and batteries.

As shown in FIG. 4, the illustrated energy storage unit 32 comprises a plurality of batteries (e.g., six batteries) 35 connected in series. An anode terminal of the energy storage unit 32 is connected to an input terminal of the DC/DC converter 34 via a power line 100. A cathode terminal of the energy storage unit 32 and a ground terminal of the DC/DC converter 34 are grounded. Each battery 35 preferably supplies twelve volts. Thus, the energy storage unit 32 advantageously supplies a total of 72 volts. As described above, the DC/DC converter 34 advantageously boosts the voltage to, for example, 100 volts, 120 volts or 250 volts. Because the illustrated batteries 35 supply a total of 72 volts, an input current required by the DC/DC converter 34 can be small. Thus, a heat loss at the input side of the DC/DC converter 34 is small. Connecting the batteries 35 in series to produce a greater input voltage to the DC/DC converter 34 permits the use of a compact, lightweight, inexpensive DC/DC converter 34.

Alternatively, one or more commercially available double-layered capacitors can replace the batteries 35 in the energy storage unit 32. The double-layered capacitors use an electrical double-layer phenomenon to provide relatively large capacitances in a low volume enclosure. The double-layer capacitors can be charged quickly by running the engine 12 for a short duration. Thus, the electrical double-layered capacitors are particularly suitable for the energy storage unit 32 if the energy storage unit 32 is used frequently to provide power to the inverter 66. For example, when the engine-driven generator 10 is used in an environment where low noise is desired, continuous power can be provided by occasionally running the engine 12 to recharge the double-layered capacitors quickly. After the double-layered capacitors are charged, the engine 12 is stopped, and the input power to the inverter 66 is provided only by the double-layered capacitors until the double-layered capacitors need to be charged again.

In the illustrated arrangement, an output power terminal of the DC/DC converter 34 is connected to the power line 74 through a diode 104 that permits a current flow from the DC/DC converter 34 to the power line 74 but prevents a current flow from the power line 74 to the DC/DC converter 34. A ground line 106 connects the DC/DC converter 34 to the ground line 76. If the DC/DC converter 34 is grounded to the same common ground as the rectifier 62 and the inverter 66, the ground line 106 is not necessary. As thus described, the DC output of the DC/DC converter 34 is electrically connected to the input of the inverter 66 in parallel with the DC output of the rectifier 62.

The DC/DC converter 34 selectively supplies the DC power thereof to the inverter 66 under control of the controller 28. The controller 28 controls the DC/DC converter 34 via a line 110. The inverter 66 thus can receive either the first DC output from the rectifier 62 or the second DC output from the DC/DC converter 34. Alternatively, the converter 66 can receive the output from the rectifier 62 and the output from the DC/DC converter 34. In the illustrated arrangement, the second switch 38 and the third switch 40 are manipulated by the operator to control the selection of which DC output to provide to the DC/DC converter 34.

Figure 3:
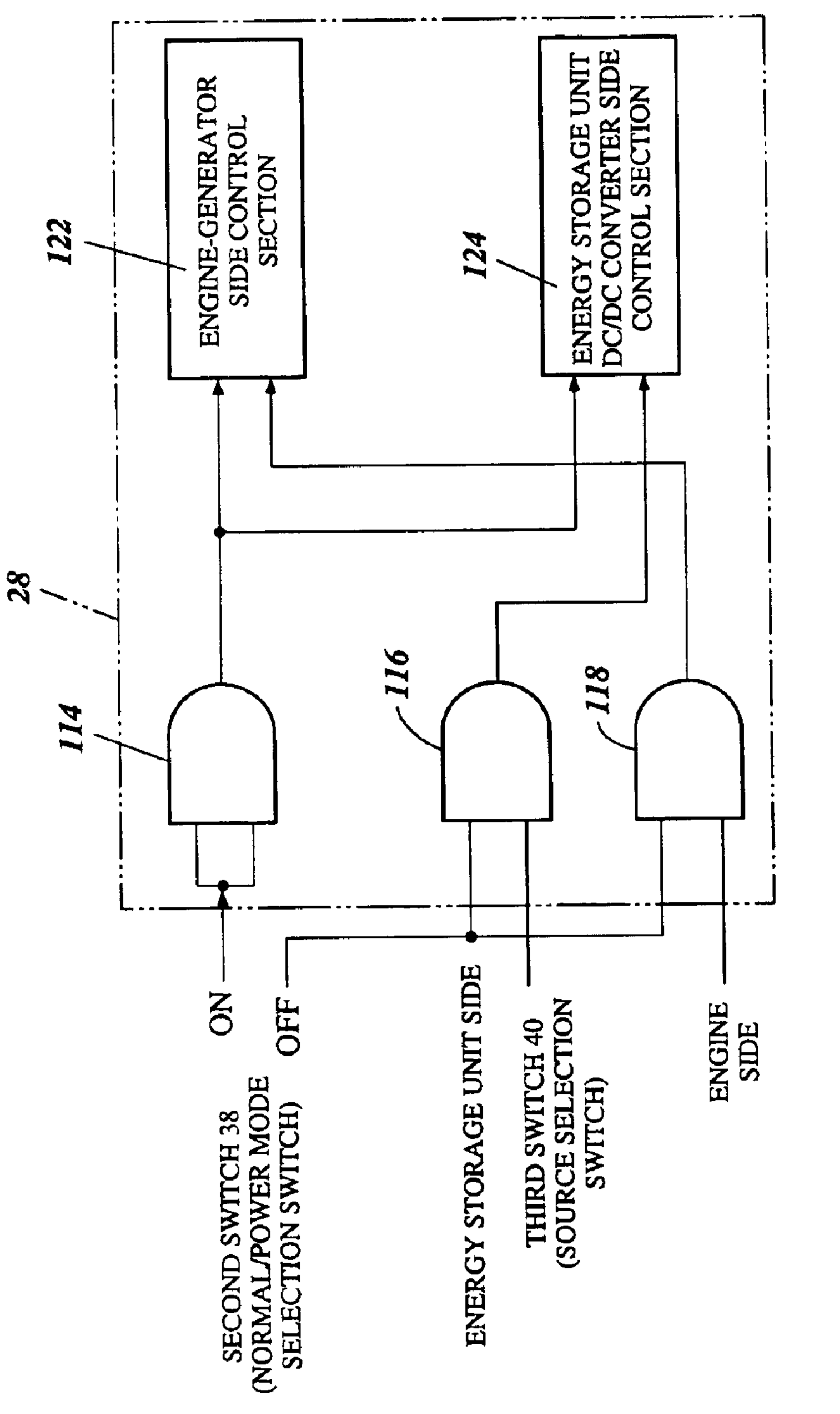
FIG. 3 is a circuit diagram of a first portion of the controller of the engine-driven generator.

As shown in FIG. 3, the controller 28 comprises AND gates 114, 116, 118. The AND gate 114 has two input terminals that are both coupled to an ON terminal of the normal/power-up mode selection switch 38. Each of the AND gates 116, 118 also has two input terminals. A first input terminal of each AND gate 116, 118 is coupled to an OFF terminal of the normal/power-up mode selection switch 38. A second input terminal of the AND gate 116 is coupled to an energy storage unit-DC/DC converter selection terminal of the source selection switch 40. The second input terminal of the AND gate 118 is coupled to an engine-generator selection terminal of the source selection switch 40.

The controller 28 additionally comprises an engine-generator side control section 122 and an energy storage unit-DC/DC converter side control section 124. The engine-generator side control section 122 controls the operation of the engine 12 and enables the output from the rectifier 62 to be provided as an input to the inverter 66. The control signals are provided to the engine 12 and to the rectifier 62 via a line 126 (which may represent a plurality of control lines).

The energy storage unit-DC/DC converter side control section 124 enables the output from the DC/DC converter 34 to be provided as an input to the inverter 66. An output terminal of the AND gate 14 is connected to both the engine-generator side control section 122 and the energy storage unit-DC/DC converter side control section 124. An output terminal of the AND gate 116 is connected to the energy storage unit-DC/DC converter side control section 124. An output terminal of the AND gate 118 is connected to the engine-generator side control section 122.

When the normal/power-up mode selection switch 38 is turned on, both the engine-generator side control section 122 and the energy storage unit-DC/DC converter side control section 124 are enabled through the AND gate 114. Thus, both the output power of the rectifier 62 and the output power of the DC/DC converter 34 are supplied to the inverter 66. On the other hand, when the normal/power-up mode selection switch 38 is turned off and the energy storage unit-DC/DC converter selection terminal of the source selection switch 40 is selected, only the energy storage unit-DC/DC converter side control section 124 is enabled and only the output power of the DC/DC converter 34 is supplied to the inverter 66. At this time, the engine 12 does not operate because the engine-generator side control section 122 is not enabled. For example, the ignition system cannot fire the air/fuel charge unless the engine-generator side control section 122 is enabled. When the normal/power-up mode selection switch 38 is turned off and the rectifier selection terminal of the source selection switch 40 is selected, the engine-generator side control section 122 is enabled and only the output power of the rectifier 62 is supplied to the inverter 66.

Figure 8:
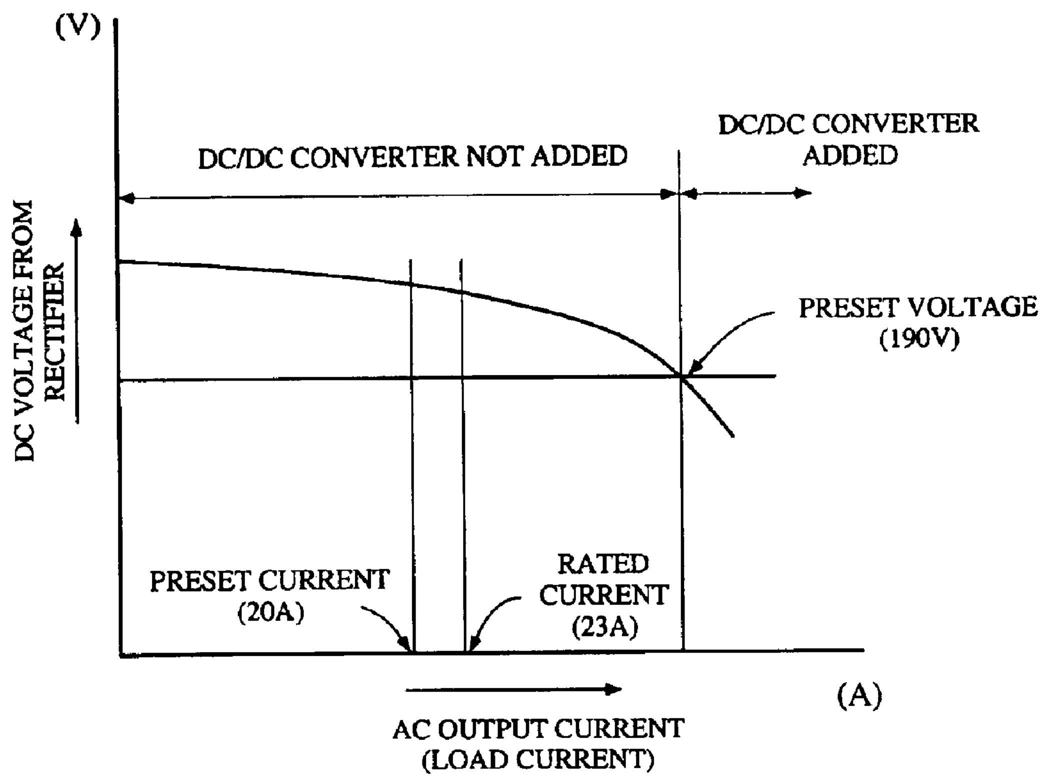
FIG. 8 is a graph that illustrates a DC voltage produced by rectifying the AC voltage from the engine-driven generator versus the AC output current.

As shown in FIG. 8, the controller 28 is able to automatically supply both the output power of the rectifier 62 and the output power of the DC/DC converter 34 to the inverter 66 even when the second switch 38 is turned under some conditions. For example, if the AC output current (load current) detected by the current sensor 70 is greater than 20 amperes and the DC voltage detected by the voltage sensor 72 is less than 190 volts, the controller 28 determines that a large load device (e.g., a device requiring substantial power) is connected to the output terminals 88, 90. The storage unit-DC/DC converter side control section 124 activates the DC/DC converter 34 to add the DC output power of the DC/DC converter 34 to the DC output power of the rectifier 62.

The reference current of 20 amperes is an exemplary current. Other reference currents (e.g., 19 amperes or 21 amperes) can be used. Also, the reference voltage of 190 volts is an exemplary voltage. Other reference voltages (e.g., 170 volts) can be used.

If the load current becomes approximately twice as large as the rated current, the controller 28 determines that the load current has suddenly increased. The controller 28 determines this state by calculating a rate of increase of the load current. Under this condition, the energy storage unit-DC/DC converter side control section 124 also activates the DC/DC converter 34 to add the output power of the DC/DC converter 34 to the output power of the rectifier 62.

Figure 9:
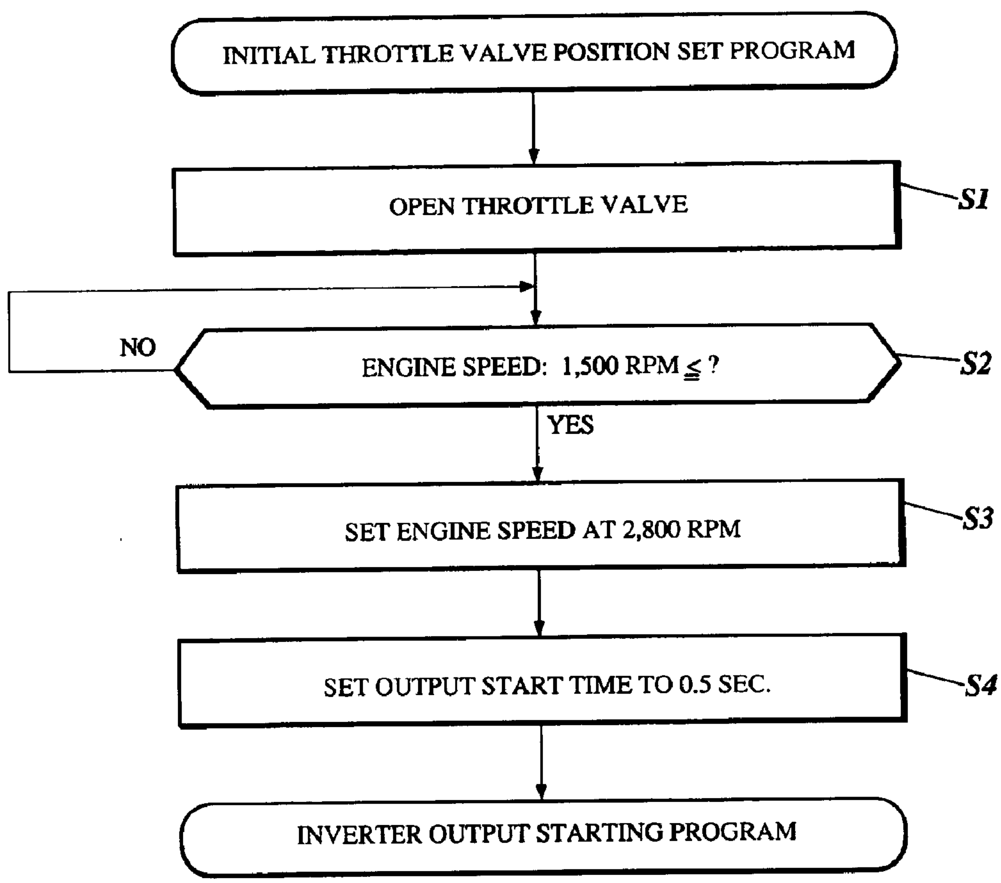
FIG. 9 is a flow chart that illustrates a control program for controlling a throttle valve of the engine in an initial control state.

As shown in FIG. 9, the illustrated throttle valve of the engine 12 is initially set in a preset position when the engine 12 starts under the control of engine-generator side control section 122 in accordance with a control program of FIG. 9, and the inverter 66 starts outputting in this state.

The method of FIG. 9 starts and proceeds to a step S1. At the step S1, the engine-generator side control section 122 controls the stepping motor 18 to open the throttle valve such that the engine speed increases toward a speed of 1,500 rpm. The method then proceeds to a step S2 to determine whether the engine speed is equal to or greater than 1,500 rpm. The engine speed is calculated by an engine speed calculation section 128, described below with reference to FIG. 5. If the determination at the step S2 is negative (e.g., the engine speed is less than 1,500 rpm), the method returns to the step S2 and repeats the step S2. If the determination at the step S2 is affirmative (e.g., the engine speed is at least 1,500 rpm), the method proceeds to a step S3. At the step S3, the control section 122 sets the engine speed 2,800 rpm. Then, the method proceeds to a step S4, and the control section 122 sets an output start time to 0.5 seconds with a timer. After the start time (0.5 seconds) elapses, the inverter 66 starts outputting the AC power.

Figure 5:
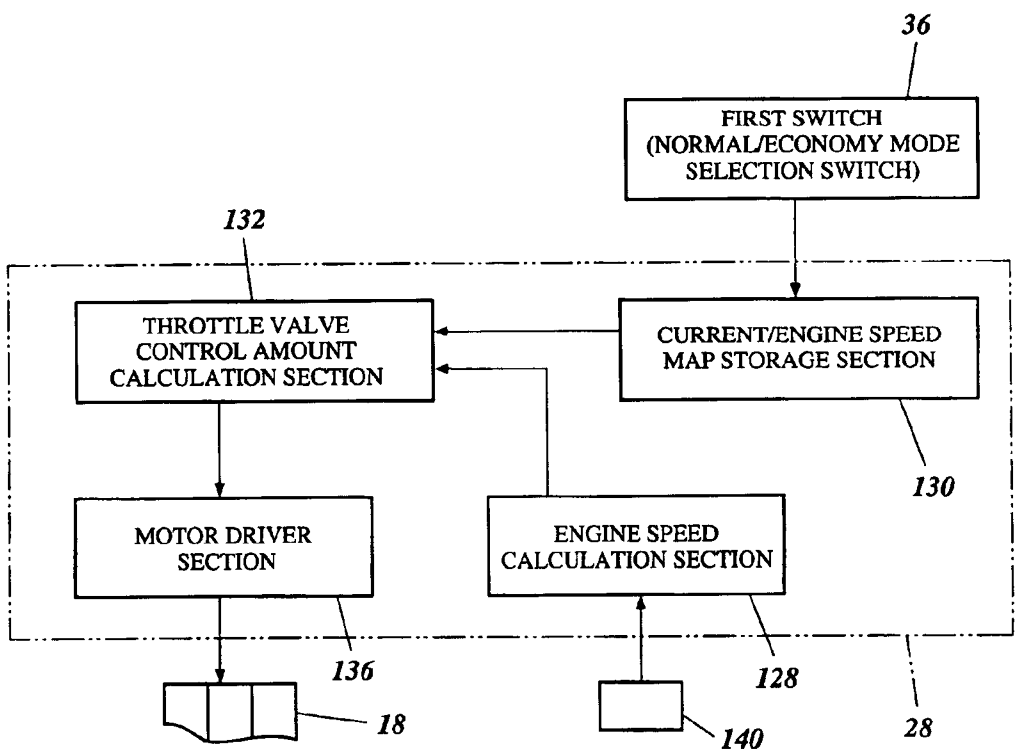
FIG. 5 is a circuit diagram of a second portion of the controller.

As shown in FIG. 5, the illustrated controller 28 additionally comprises a current/engine speed map storage section 130, a throttle valve control amount calculation section 132, and a motor driver section 136.

Figure 6:
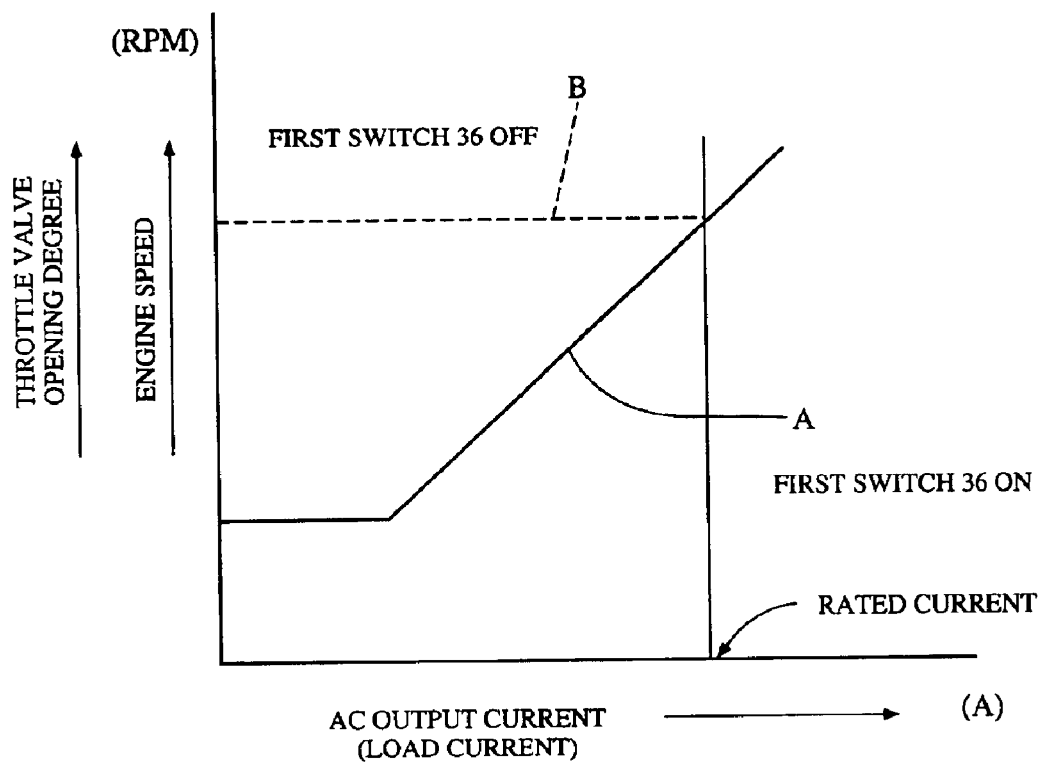
FIG. 6 is a graph that illustrates a speed (or a throttle position) of the engine versus an AC output current (load current) of the engine-driven generator.

The current/engine speed map storage section 130 is substantially part of the memory and stores a control map comprising an AC output current (load current) versus an engine speed. The relationship stored in the map is illustrated in FIG. 6. The map involves two characteristics A and B. If the characteristic A is selected, the engine speed generally changes as the AC output current changes. On the other hand, if the characteristic B is selected, the engine speed is fixed at least in a range less than the rated current.

Figure 7:
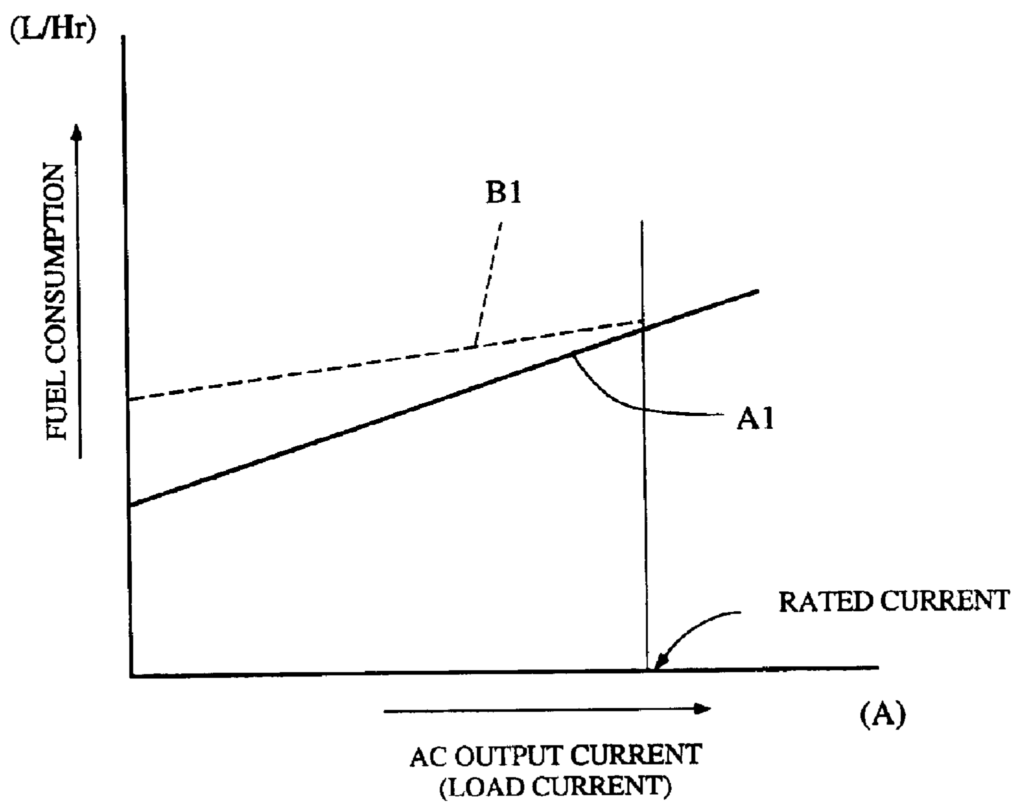
FIG. 7 is a graph that illustrates fuel consumption of the engine versus the AC output current of the engine-driven generator.

The operator can select either the characteristic A or the characteristic B with the normal/economy mode selection switch 36. For example, when the normal/economy mode selection switch 36 is turned on, the characteristic A is selected. Also, when the normal/economy mode selection switch 36 is turned off, the characteristic B is selected. As shown in FIG. 7, the fuel consumption A1 associated with the characteristic A is less than the fuel consumption B2 associated with the characteristics B. Accordingly, the operation using the characteristic A is economical. In addition, the engine noise occurring when the engine is operated in accordance with the characteristic A is less than when the engine is operated in accordance with the characteristic B. On the other hand, the characteristic B is suitable for certain load devices such as, for example, an electric grinder, because the load current of such kinds of load devices changes quite often and the stable engine speed is convenient with the engine-driven generator 10.

The throttle valve control amount calculation section 132 calculates a control amount of the throttle valve opening based upon the selection of the characteristic A or the characteristic B with the selected characteristic. The control amount is determined such that an actual engine speed approaches the preset engine speed with the characteristic A or with the characteristic B by increasing or decreasing the opening degree of the throttle valve and thereby increasing or decreasing the engine speed. The actual engine speed can be calculated by the engine speed calculation section 132. An output shaft (crankshaft) rotation sensor 140 is provided at a location proximate to the output shaft of the engine 12. The engine speed calculation section 128 calculates the actual engine speed using a signal from the output shaft rotation sensor 140. The motor driver section 136 then actuates the stepping motor 18 based upon the control amount calculated by the throttle valve control amount calculation section 132. Accordingly, the engine speed changes or is fixed along the characteristic A or the characteristic B, respectively. Preferably, a fixed engine speed is 3,600 rpm.

Figure 10:
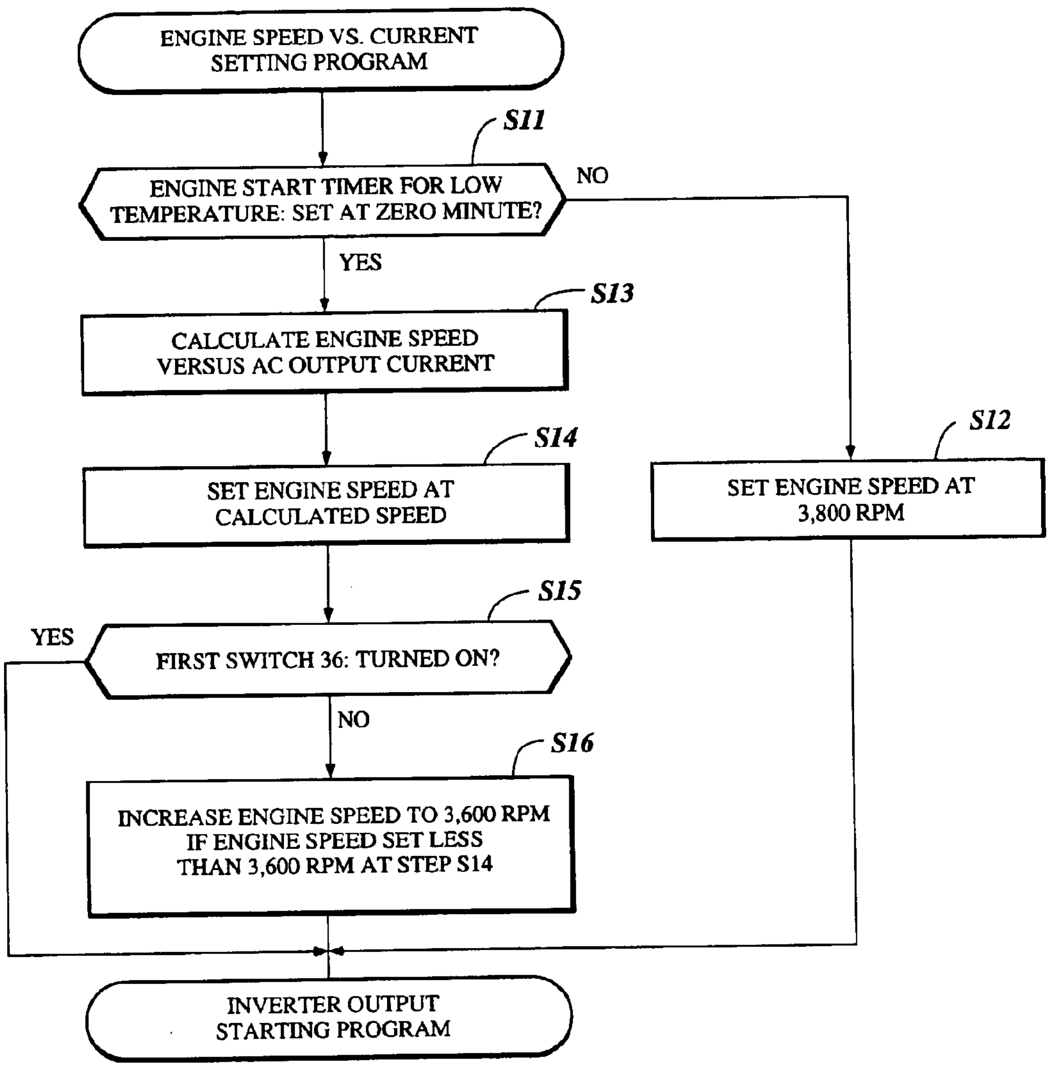
FIG. 10 is a flow chart that illustrates a control program responsive to a first switch.
Figure 11:
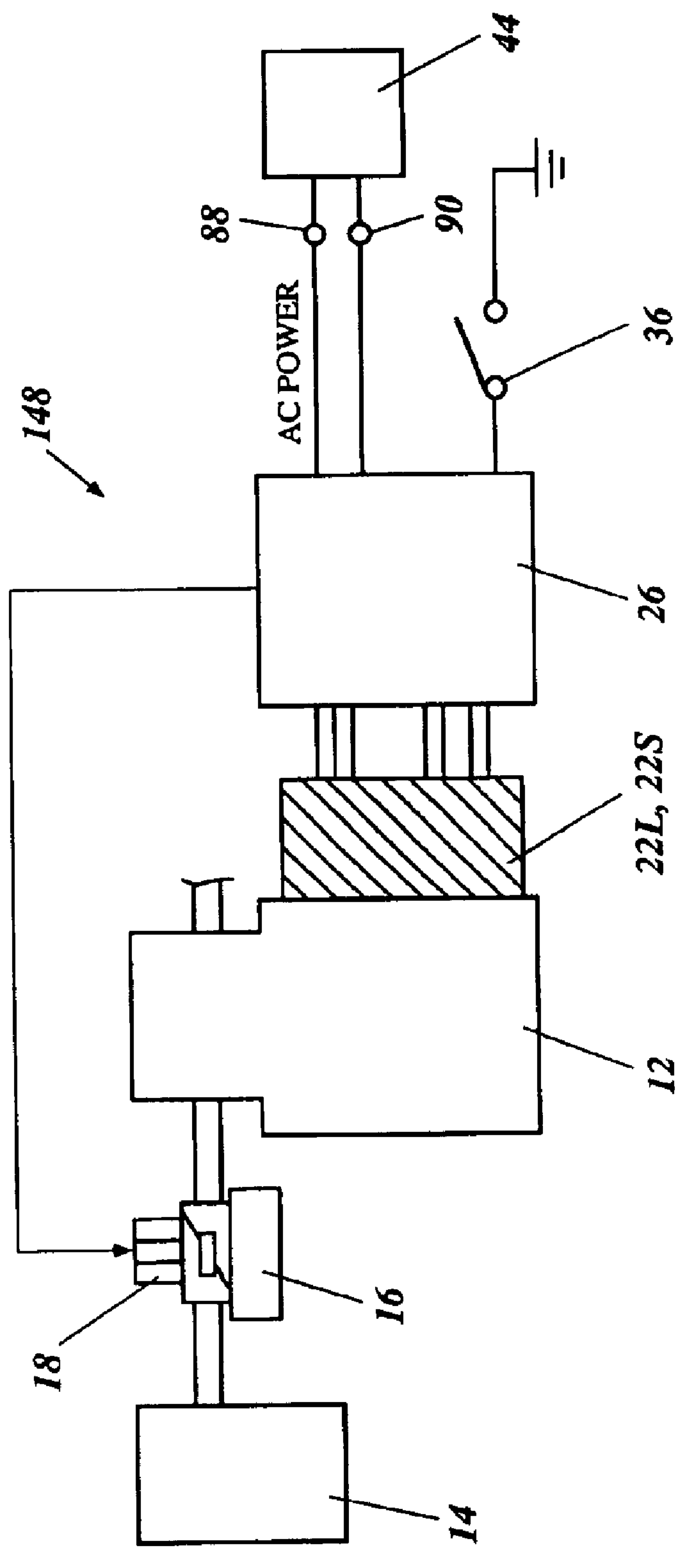
FIG. 11 is a diagrammatic view of a modified engine-driven generator configured in accordance with another embodiment of the present invention.

FIG. 10 illustrates an exemplary control program that defines a method for setting the engine speed versus the AC output current (load current). The engine speed setting method starts and proceeds to a step S11. At the step S11, the controller 28 determines whether an engine start timer for low temperature has been set to zero. Preferably, a temperature sensor (not shown) is provided to detect a temperature proximate to the engine-driven generator 10. The controller 28 previously determines whether the temperature is greater than a preset temperature such as, for example, 0 degrees Celsius (0° C.) in another control program. If the temperature is equal to or less than the preset temperature, the start timer is not set at zero. Rather, the start timer is set to several minutes. On the other hand, if the temperature is greater than the preset temperature, the start timer is set at zero.

If the controller 28 determines at the step S11 that the start time is not zero (i.e., the method makes a negative (N) determination in the step S11), the method proceeds to a step S12. At the step S12, the controller 28 sets the engine speed to, for example, 3,800 rpm. The motor driver section 136 of the controller 28 thus actuates the stepping motor 18 to force the engine 12 to operate at the engine speed of 3,800 rpm for several minutes to warm up the engine 12. The inverter 66 starts outputting power corresponding to this engine speed, and the method returns to the step S 11.

If the controller 28 determines at the step S11 that the low temperature timer is set at zero minutes (i.e., the method makes a positive (Y) determination at the step S11), the method proceeds to a step S13 where the controller 28 calculates the engine speed using the characteristic A of the control map shown in FIG. 6. The method then proceeds to a step S15.

At the step S15, the method determines whether the normal/economy mode selection switch 36 has been turned on. If the determination is affirmative (i.e., the normal/economy mode switch 36 is on), the motor driver section 136 of the controller 28 controls the stepping motor 18 such that the engine 12 operates at the engine speed set at the step S14. The inverter 66 starts outputting power corresponding to this engine speed, and the method returns to the step S11.

If the determination in the step S15 is negative (i.e., the normal/economy mode switch 36 is not on), the controller 28 sets the engine speed generally at 3,600 rpm unless the engine speed has been set equal to or greater than 3,600 rpm at the step S14. The motor driver section 136 actuates the stepping motor 18 to force the engine 12 to operate at the engine speed of 3,600 rpm. The inverter 66 starts outputting corresponding to the engine speed. Meanwhile, the engine speed setting method starts again.

Alternatively, the engine 12 advantageously incorporates a throttle position sensor to sense an actual throttle valve opening. In this alternative, a throttle valve opening degree replaces the engine speed as illustrated in parenthesis in FIG. 6. The engine speed calculation section 128 and the output shaft rotation sensor 140 are not necessary in this alternative control; however, it should be noted that the engine speed can completely correspond to the throttle valve opening degree.

Operation Modes of Engine-driven Generator

The illustrated engine-driven generator 10 operates in the following modes.

(1) Normal Power Mode

Normally, the operator sets the normal/power-up mode selection switch 38 off to select the power-up mode. The operator also selects the engine-generator side using the source selection switch 40. The engine-generator side control section 122 is enabled via the AND gate 118 and activates the engine 12. In the normal power mode, the engine 12 is controlled for economy operation or non-economy operation in accordance with the state of the normal/economy mode selection switch 36.

(a) Economy Operation

If the operator needs a constant output (or economy operation), the operator turns the normal/economy mode selection switch 36 off to select the economy operation. The engine 12 thus operates at a constant engine speed (e.g., approximately 3,600 rpm) in accordance with the characteristic B of FIG. 6. The generator 22 also generates a constant AC power corresponding to the constant engine speed, and the power converting unit 26 outputs the constant AC power.

(b) Non-economy Operation

If the operator needs a variable output (or non-economy operation), the operator turns the normal/economy mode selection switch 36 on to select non-economy operation. The engine 12 thus operates at various engine speeds in response to the AC output current (load current) sensed by the current sensor 70. The generator 22 generates an AC power corresponding to the engine speed, and the power converting unit 26 outputs the variable AC power.

(2) Quiet Operation Mode

If the operator wants to select quiet operation of the engine-driven generator 10, the operator sets the normal/power-up mode selection switch 38 off and selects the storage unit-DC/DC converter side using the source selection switch 40. The energy storage unit-DC/DC converter side control section 124 is enabled via the AND gate 116 and stops the engine operation so that the engine 12 is no longer rotating and no power is generated. The energy storage unit-DC/DC converter side control section 124 controls the DC/DC converter 34 to output the DC power to the inverter 66. The power converting unit 26 thus outputs an AC power corresponding to the DC power. Because the engine 12 does not operate in this mode, the engine-driven generator 10 can provide the required power output under quiet conditions.

(3) Power-Up Mode

If the operator wants to use a load device that requires a relatively large power that can exceed the rated current, the operator sets the normal/power-up mode selection switch 38 on. Both the engine-generator side control section 122 and the energy storage unit-DC/DC converter side control section 124 are enabled via the AND gate 114. Thus, the engine 12 operates to drive the generator 22. The output from the generator 22, rectified by the rectifier 62, and the output from the DC/DC converter 34 are both supplied to the inverter 66. The power converting unit 26 outputs the full power to the load device. Preferably, the engine 12 operates at various engine speeds in response to the load current sensed by the current sensor 70 regardless of whether the normal/economy mode selection switch 36 is turned on or is turned off.

(4) Automatic Power-up Mode

The illustrated engine-driven generator 10 automatically operates in the power-up mode under some conditions, such as, for example, when the controller 28 determines that the load device requires power that causes the load current to exceed the rated current or determines that the load current suddenly increased. The controller 28 determines that the load device requires such an amount of power using the relationship shown in FIG. 8. For example, if the load current is greater than 20 amperes and the DC voltage from the rectifier 62 is less than 190 volts, the controller 28 determines that the load device requires a large amount of power. The controller 28 also determines that the load current suddenly increases by calculating the rate of increase of the load current sensed by the current sensor 70.

In this automatic power-up mode, both the engine-generator side control section 122 and the energy storage unit-DC/DC converter side control section 124 are enabled through the AND gate 114. The outputs from the rectifier 62 and the DC/DC converter 34 are both supplied to the inverter 66. The power converting unit 26 outputs the full power to the load device. Preferably, the engine 12 operates at various engine speeds in response to the load current sensed by the current sensor 70 regardless of whether the normal/economy mode selection switch 36 is turned on or is turned off The operation modes described above are exemplary modes. Other operation modes can be added. Alternatively, the operation modes can be modified. For example, the controller 28 can automatically add the power from the DC/DC converter 34 to the power from the rectifier 62 for a predetermined period of time whenever a load device requires a large amount of power immediately after the load device is switched. The controller 28 performs this function without using the sensed signals from either the current sensor 70 or the voltage sensor 72. An example of a load device is an electric pump. Preferably, a load device selection button is provided, and the operator can push the load device selection button when such a load device (e.g., the pump) is connected.

As described above for the illustrated arrangement, the operator can select, for example, between a quiet operation mode with the energy storage unit being the sole source of output power or a more powerful operation mode in which both the generator and the energy storage unit provide the output power. The latter selection advantageously allows a relatively large load device to be connected to the engine-driven generator. In addition, if the latter selection is made, the engine-driven generator can quickly provide necessary power even though a relatively large load device abruptly requires a large power and the engine cannot follow the requirement. The illustrated arrangement can be used for a large number of applications in addition to the applications described herein.

Modified Engine-driven Generator

FIGS. 11–14 illustrate a modified engine-driven generator 148 configured in accordance with another embodiment of the present invention. The same components and members that have been already described above are not described again. The same reference numerals that have been assigned to those components and members in the previous figures are assigned to like components in FIGS. 11–14. The energy storage unit 32, the DC/DC converter 34 and the second and third switches 38, 40 are not shown in FIGS. 11 and 12 and may not be required for certain embodiments of the engine-driven generator 148.

In the illustrated arrangement, the engine-driven generator 148 incorporates two generators 22L, 22S. Each generator 22L, 22S has a similar construction to the generator 22 described above, and the two generators 22L, 22S are similar to each other; however, the generator 22L can generate more power than the generator 22S because relatively larger generator coils 48 are provided in the generator 22L than in the generator 22S.

Figure 12:
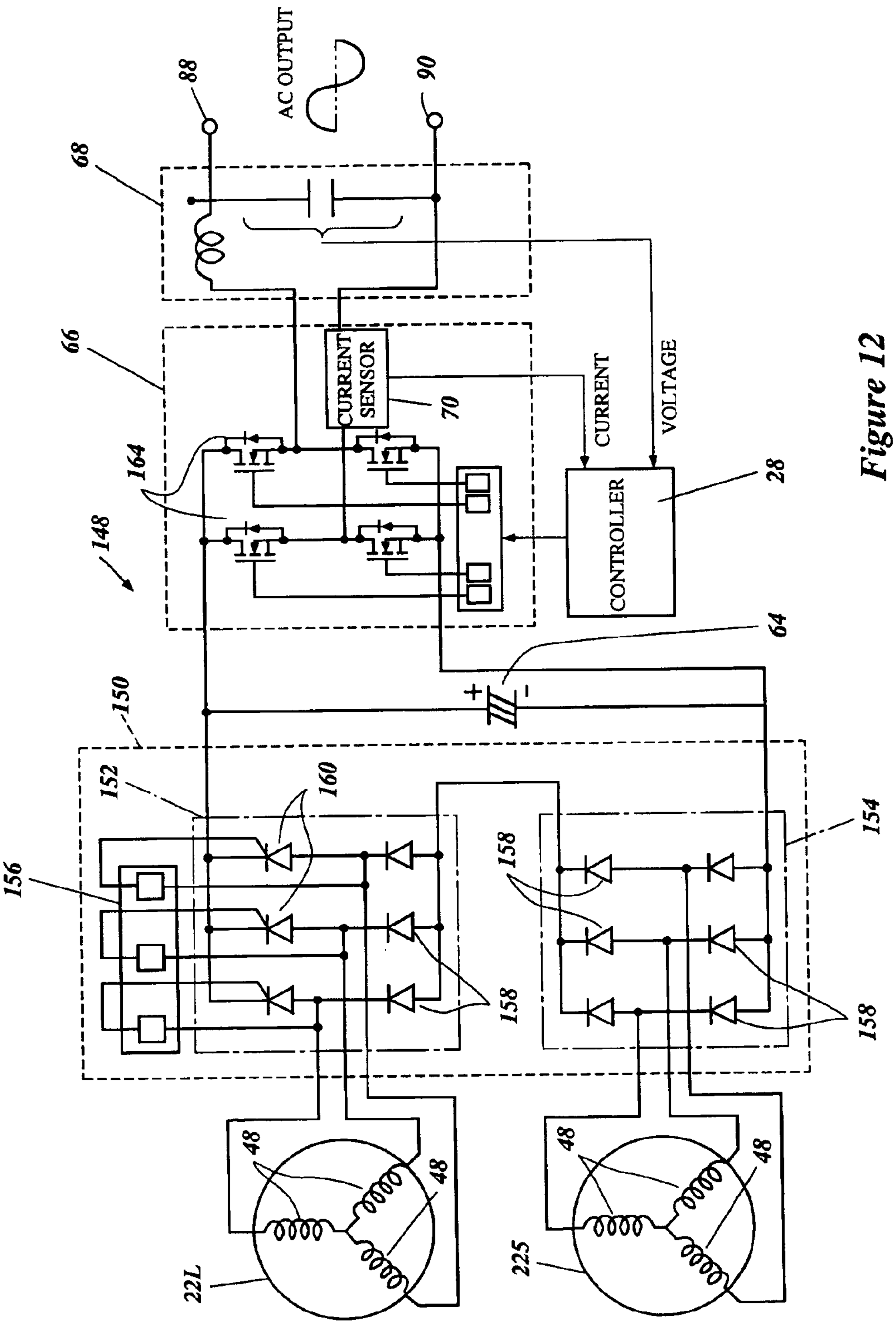
FIG. 12 is a circuit diagram of the engine-driven generator of FIG. 11.

As shown in FIG. 12, the outputs of the generators 22L, 22S are connected as inputs to a rectifier assembly 150. The rectifier assembly 150 comprises two full-wave rectifiers 152, 154 and a voltage stabilization circuit 156. The rectifier 152 comprises diodes 158 and thyristers 160 and is connected to the voltage stabilization circuit 156 through the thyristers 160. The rectifier 62 of FIG. 2 is substantially the same as the rectifier 152 and can incorporate the same voltage stabilization circuit 156. The generator 22L is connected to the rectifier 152. The generator 22S is connected to the rectifier 154. The rectifiers 152, 154 are connected in series with one another such that the voltage generated by the rectifier 152 is added to the voltage generated by the rectifier 154 to produce an output voltage from the rectifier assembly 150 that is equal to the sum of the voltage generated by the rectifier 152 and the voltage generated by the rectifier 154.

The output voltage from rectifier assembly 150 is provided as an input to the inverter 66. An electrolytic capacitor 64 is connected across the output terminals of the rectifier assembly 150. The inverter 66 comprises metal-oxide semiconductor (MOS) transistors 164. The illustrated inverter of FIG. 12 incorporates the current sensor 70 therein. The inverter 66 is connected to a harmonics filter 68 such that the outputs of the inverter 66 can be supplied to load devices at the output terminals 88, 90. The harmonics filter 68 removes harmonics in the output power from the inverter 66. Also, a voltage across a capacitor in the harmonics filter 68 is sensed, as described below, to stabilize the output power.

The controller 28 controls the inverter 66 and also controls the rectifier assembly 150 and the DC/DC converter (not illustrated in FIG. 12). The second and third switches 38, 40 (FIGS. 1–3) can be included in the controls as well as the first switch 36. The controller 28 in this arrangement may advantageously have the same structure as described above and as illustrated in FIGS. 3 and 5, and may perform the same control operations as described above and illustrated in FIGS. 6–10.

Figure 13:
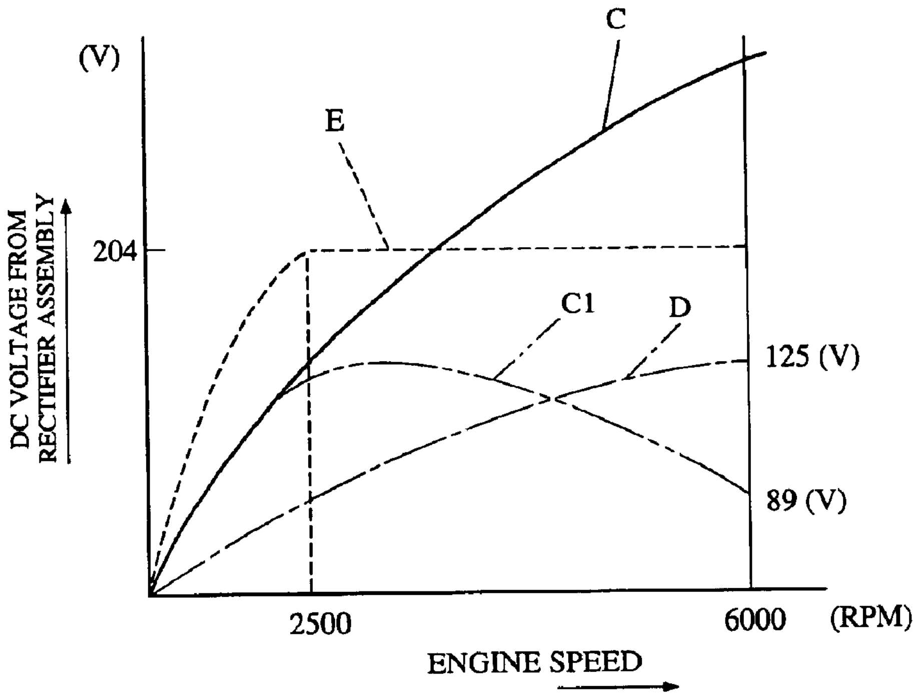
FIG. 13 is a graph that illustrates the rectified DC voltage from a rectifier assembly of the modified engine-driven generator versus engine speed.

As shown in FIG. 13, a DC voltage from the rectifier 152 changes in accordance with a characteristic C (solid line) in response to the engine speed unless the voltage stabilization circuit 156 is provided. In accordance with the characteristic C, a voltage at an engine speed of 6,000 rpm is fairly large (e.g., greater than 200 volts). The voltage stabilization circuit 156 is provided to cause the DC voltage from the rectifier 152 to change in accordance with a characteristic C1 so that, for example, the voltage from the rectifier 160 at the engine speed of 6,000 rpm is 89 volts. A DC voltage from the rectifier 154 changes in accordance with a characteristic D in response to the engine speed. For example, a voltage from the rectifier 154 at an engine speed of 6,000 rpm is 125 volts. Since the rectifier 152 and the rectifier 154 are connected in series, the DC voltage having the characteristic C1 and the DC voltage having the characteristic D are added together, and the sum of the two voltages changes in accordance with the characteristic E. In particular, the DC voltage according to the characteristic E generally increases to 204 volts as the engine speed increases toward approximately 2,500 rpm. After the engine speed reaches approximately 2,500 rpm, the DC voltage is generally maintained at this voltage, e.g., 204 volts, until the engine speed increase to approximately 6,000 rpm. Thus, the range of the DC voltage with the characteristic E between the engine speed of 2,500 rpm and the engine speed of 6,000 rpm is maintained approximately constant.

Figure 14:
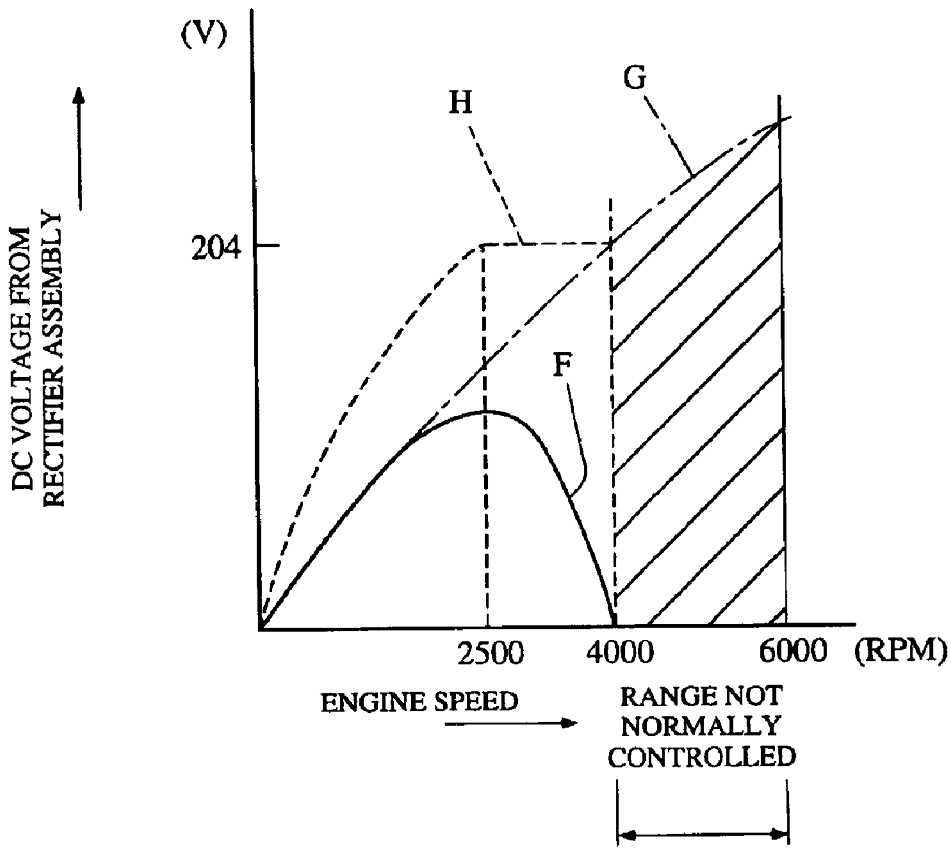
FIG. 14 is a graph that illustrates the DC voltage from the rectifier assembly versus engine speed in an embodiment of an engine-driven generator having two generators of the same size.
Figure 15:
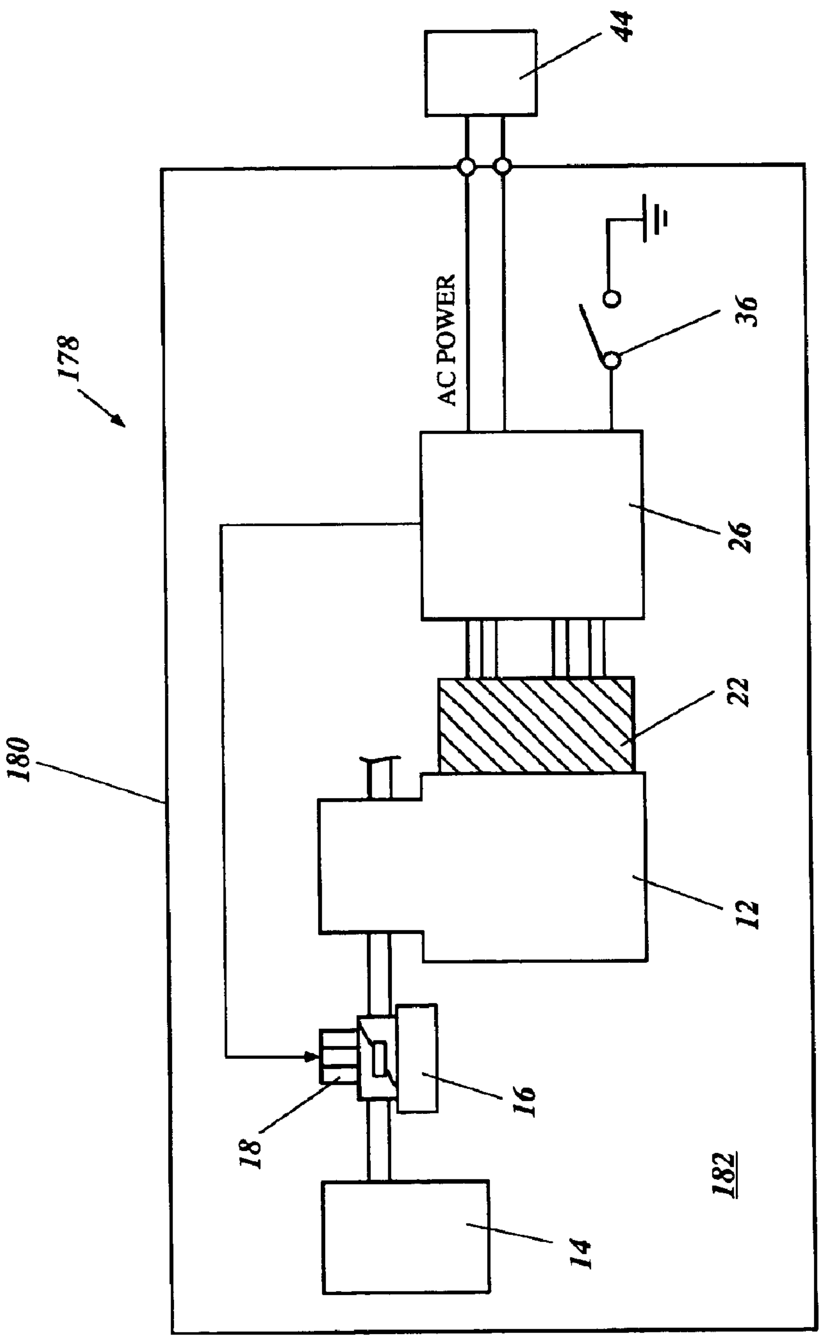
FIG. 15 is a diagrammatic view of a modified engine-driven generator configured in accordance with a further embodiment of the present invention.
Figure 16:
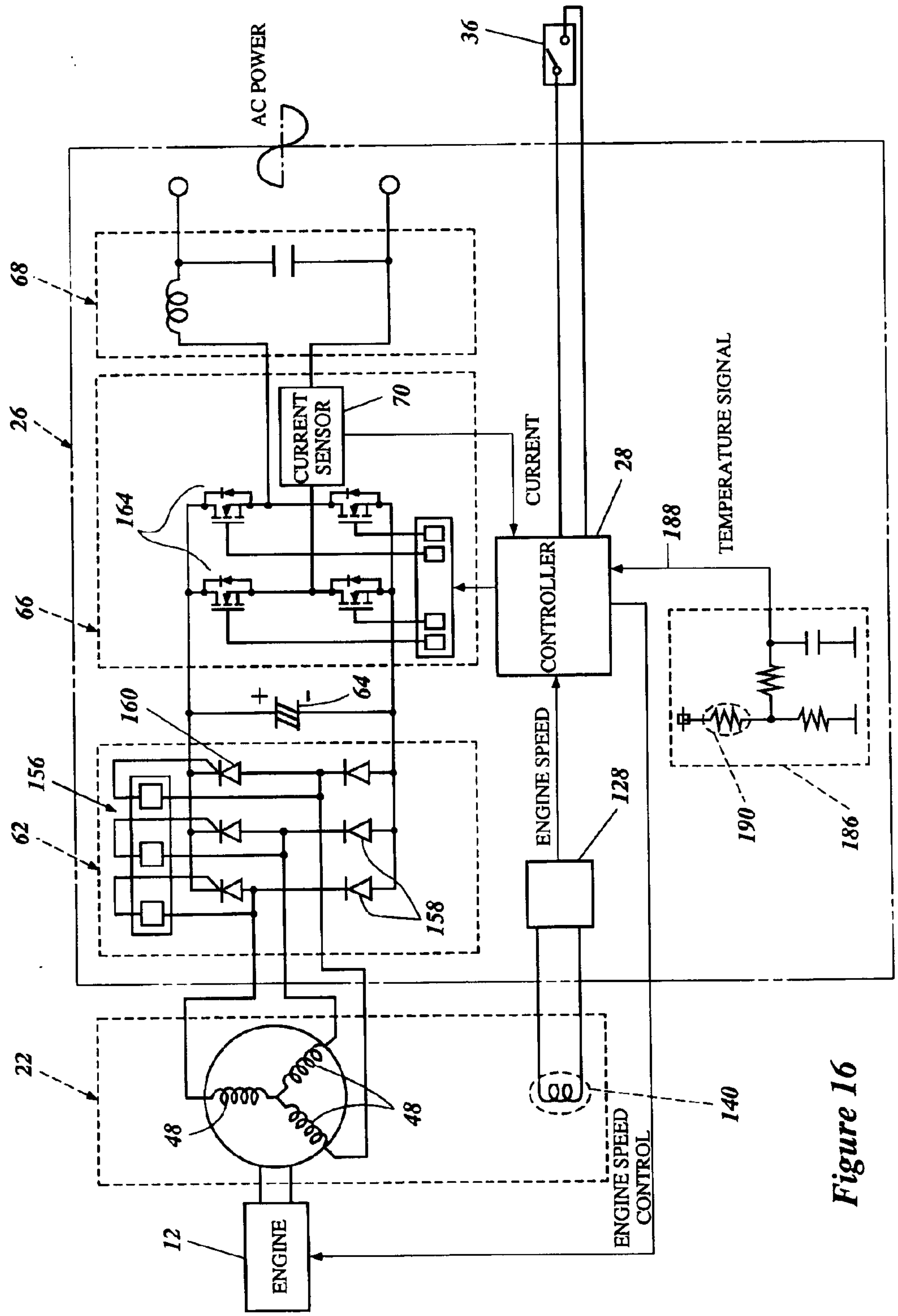
FIG. 16 is a circuit diagram of the engine-driven generator of FIG. 15.

As shown in FIG. 14, if the same sized generators are provided, the DC voltage that is stabilized by the voltage stabilization circuit 156 could quickly go down to zero volts at 4,000 rpm, for example, as illustrated by a characteristic F, although another DC voltage that is not stabilized can continue to increase beyond 200 volts in the range over 4,000 rpm as illustrated by a characteristic G. Accordingly, an added characteristic H can be constant in a relatively short range between the engine speed of 2,500 rpm and the engine speed of 4,000 rpm. At engine speeds greater than 4,000 rpm, the DC voltage having the characteristic H increases in accordance with the characteristics G. That is, the DC voltage having the characteristic H cannot be normally controlled over 4,000 rpm.

As thus described, in the preferred embodiment, the generators 22L, 22S in the illustrated arrangement have different sizes (e.g., power generating capacities). In particular, the generator 22L is larger than the generator 22S. The DC voltage can be kept at 204 volts between the engine speeds 2,500 rpm and 6,000 rpm. Because the DC voltage of 204 volts can produce an effective AC voltage of 120 volts without the sine wave form thereof distorted, the engine-driven generator in this arrangement can provide a superior output in such a relatively long range of the engine speed.

Because the DC voltage does not exceed 204 volts in this arrangement, the voltage capacity of electrical components of the engine-driven generator does not need to be large.

Also, the illustrated rectifier assembly 150 only needs one voltage stabilization circuit 156 for the rectifier 152. The rectifier 154 does not require a voltage stabilization circuit. Thus, the engine-driven generator 148 in this arrangement can have a simple structure.

In addition to other advantages, a constant voltage can be obtained for a greater range without requiring any switching mechanisms that switch from one generator to another generator or that switch from one generator component to another generator component. No excessive or sudden changes in the voltage characteristic and no electrical noises caused by switching are generated by the illustrated arrangement.

More than two generators can be used in the engine-driven generator 148. Also, additional voltage stabilization circuits (preferably less than the number of generators) can be provided in the engine-driven generator.

Alternative Embodiment of Modified Engine-driven Generator

A modified engine-driven generator 178 configured in accordance with a further embodiment of the present invention is described below with reference to FIGS. 15–19. The same components and members that have been already described above are not described again. The same reference numerals that have been assigned to those components and members in the previous figures are assigned to like components in FIGS. 15–19. The energy storage unit 32, the DC/DC converter 34 and the second and third switches 38, 40 are not shown in FIGS. 15 and 16 and may not be required for certain embodiments of the engine-driven generator 178.

In the illustrated arrangement, a noise-suppressing housing 180 surrounds the engine 12, the generator 22 and other engine/generator components. The engine-driven generators 10, 148 described above can also have such a housing. The housing 180 effectively inhibits engine noise and generator noise from disturbing the operator or persons who are around the engine-driven generator 178.

On the other hand, however, the heat produced by the engine 12 and the generator 22 can stay in a space 182 defined by the housing 180. The temperature of air in the space 182 thus increases when the engine 12 operates. The high temperature of the air can affect the operations of the engine and the generator. Particularly, the efficiency for generating power can deteriorate as the internal resistances of the components increase with increased temperature. That is, the current sensor 70 detects the output current decreasing because of the increased resistances.

Under the increased temperature condition, if the voltage sensor 95 were not provided in the foregoing engine-driven generator 10, for example, the controller 28 could determine that the load device does not need a high power because the current sensor 70 indicates that the output current decreases. The controller 28 thus actuates the stepping motor 18 to decrease the throttle valve opening degree such that the engine speed decreases. Then, the output voltage decreases further until the engine-driven generator can no longer supply sufficient voltage to the load device.

However, the foregoing engine-driven generator 10 is provided with the voltage sensor 95 and can properly inform the controller 28 that the load device still need the high power and the controller 28 can normally control the inverter 28.

The engine-driven generator 178 in this modified arrangement includes another technique to improve the heat problem without the voltage sensor. However, it should be noted that the engine-driven generator 178 can still be provided with the voltage sensor for the improvement of the heat problem or other purposes.

The engine-driven generator 178 incorporates a temperature sensor unit 186 that detects a temperature of the air in the space 182, preferably, an air temperature in the power converting unit 26. The temperature sensor unit 186 is connected to the controller 28 through a proper interface to send a temperature signal to the controller 28, preferably, the throttle valve calculation section 132 (FIG. 17) thereof through a signal line 188. The temperature sensor unit 186 comprises a temperature sensor such as, for example, a thermistor 190.

Figure 17:
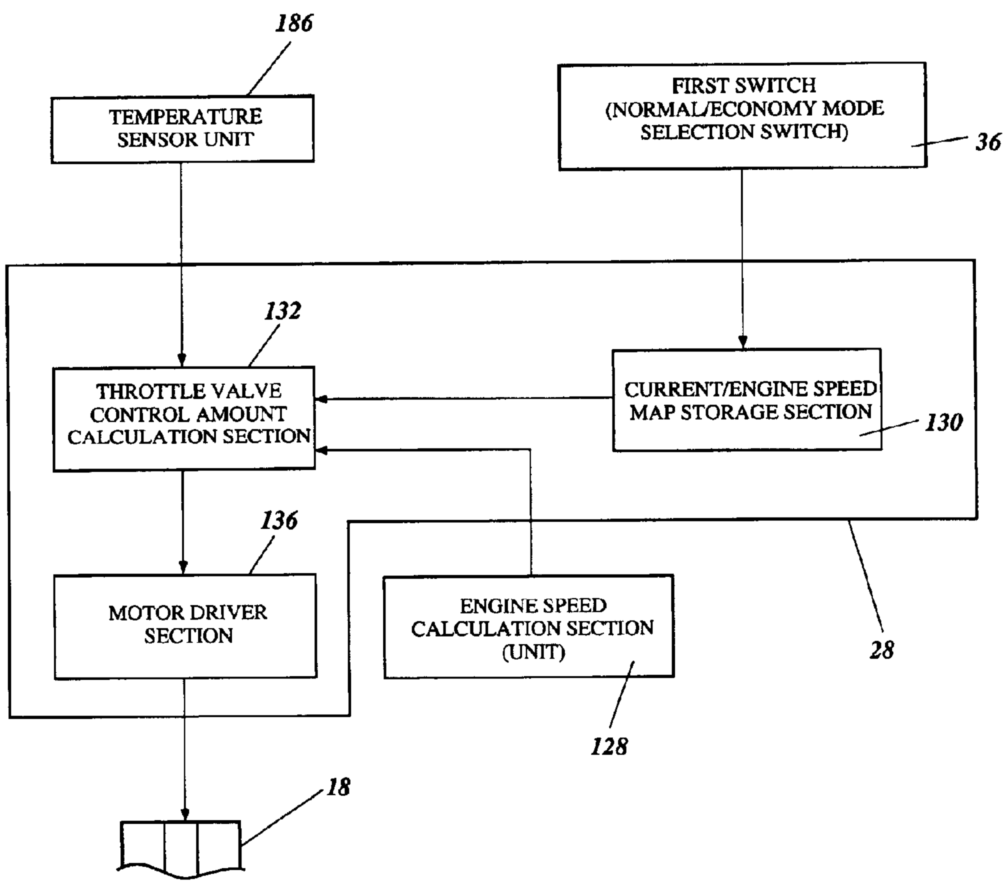
FIG. 17 is a circuit diagram of a controller that receives a temperature signal from a temperature sensor unit to control the engine operation.

The engine speed calculation section 128 in this modified arrangement is located out of the controller 28 as an engine speed calculation unit as shown in FIG. 17. However, the engine speed calculation unit is the same as the foregoing engine speed calculation section 128. The output shaft rotation sensor 140 is omitted in FIG. 17.

Figure 18:
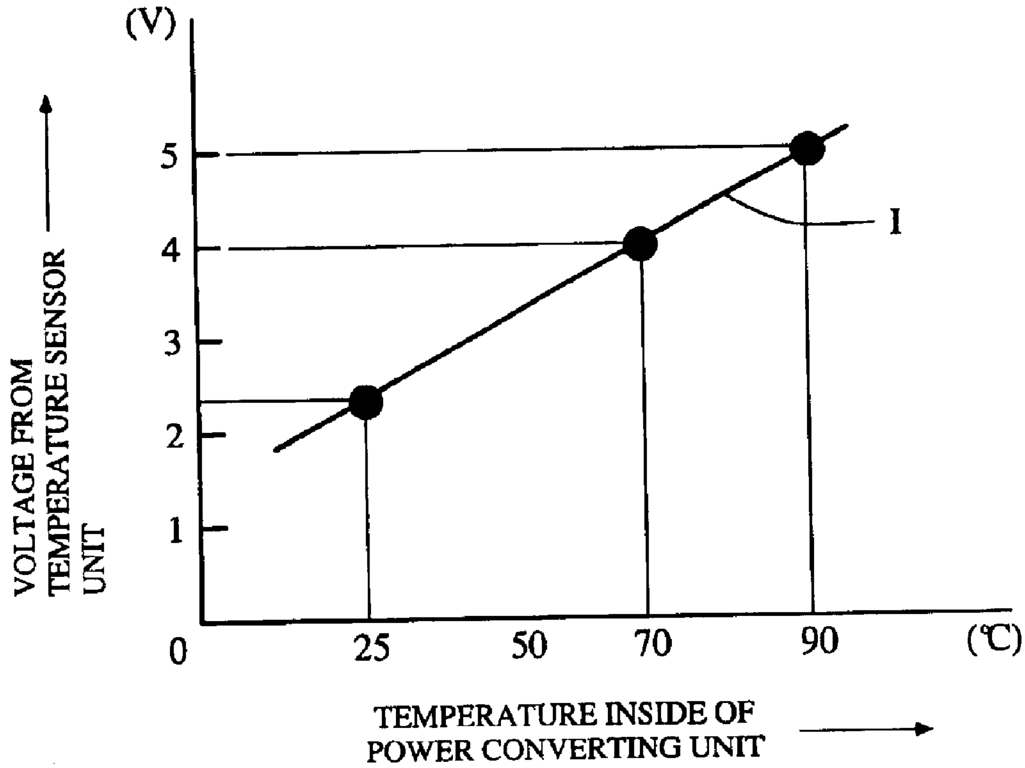
FIG. 18 is a graph that illustrates input voltages to the controller versus temperatures inside a heatproof housing.

As shown in FIG. 18, the illustrated temperature sensor unit 186 has a characteristic I and outputs a voltage that generally changes in proportion to a temperature in the power converting unit 26. For instance, the voltage at the temperature 25° C. is approximately 2.3 volt, the voltage at the temperature 70° C. is approximately 4.0 volt and the voltage at the temperature 90° C. is approximately 5.0 volt.

Figure 19:
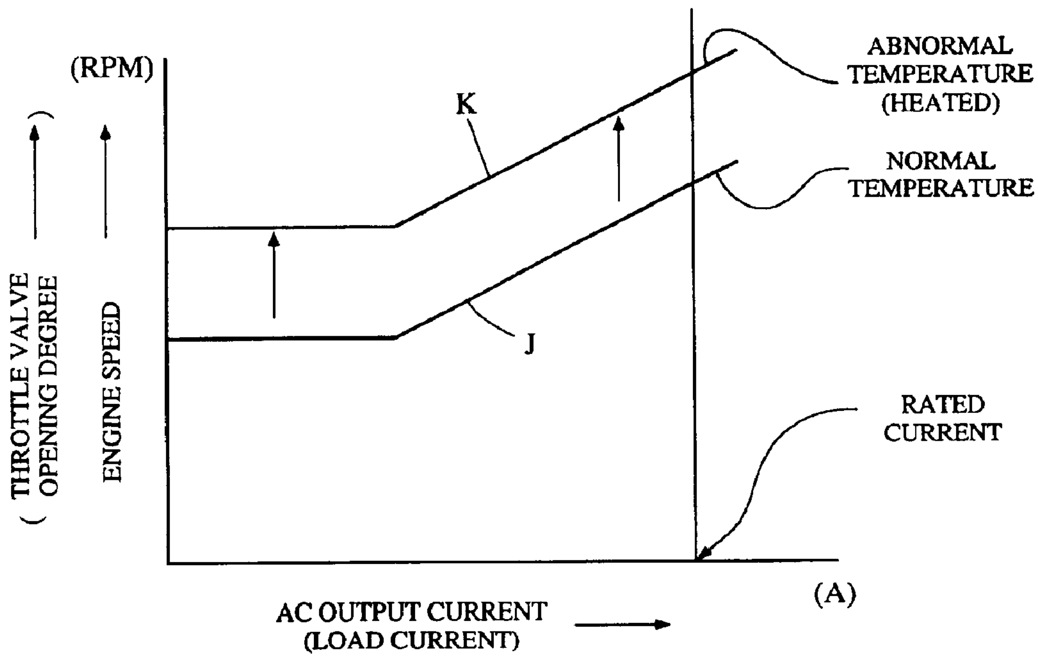
FIG. 19 is a graph that illustrates engine speed or throttle position of the engine versus an AC output current (load current) of the another modified engine-driven generator.

As shown in FIG. 19, the controller 28 operates in accordance with a control map that comprises engine speed versus an AC output current (load current). The illustrated controller 28 controls the inverter 66 using at least two characteristics J and K, although additional characteristics can be included. The characteristic J and the characteristic K are similar to each other, and the engine speed generally increases when the AC output current increases; however, the engine speed controlled in accordance with the characteristic K is higher than the engine speed controlled in accordance with the characteristic J.

In this embodiment, the controller 28 determines that the temperature is normal if the sensed temperature is less than 90° C. and selects the characteristic J. Also, the controller 28 determines that the temperature is abnormally high if the sensed temperature is equal to or greater than 90° C. and selects the characteristic K. The controller 28 controls the stepping motor 18 such that the engine speed changes in accordance with either the characteristic J or the characteristic K. Because the engine speed controlled in accordance with the characteristic K is higher than the engine speed controlled in accordance with the characteristic J, the generator 22 generates a higher power under the abnormal temperature condition than under the normal temperature condition. Thus, the engine-driven generator 178 can provide a proper power even under the high temperature condition without using any voltage sensor.

Similar to the engine-driven generator 10, the engine 12 in this arrangement can alternatively incorporate a throttle position sensor to sense an actual throttle valve opening. As shown in parentheses in FIG. 19, the throttle valve opening degree can replace the engine speed. It should be noted, however, the engine speed can completely correspond to the throttle valve opening degree.

The illustrated temperature sensor unit 186 detects the air temperature in the space 182. Generally, the temperature inside of the housing 180 does not depend on location and is generally equal at any locations. The temperature sensor unit 186 thus can be placed at any position in the space 182 and can even detect a temperature of generator components such as, for example, a temperature of the generator coils 48.

The controller 28 does not necessarily require the control map and can calculate an engine speed that is added to a basic engine speed.

Decompression Mechanism of Engine

With reference to FIGS. 20–26, the engine 12 preferably incorporates a decompression mechanism 200.

Typically, the illustrated engine 12 is manually started by the operator with a recoil starter unit. The recoil starter unit comprises a starter rope that is normally coiled by force of a bias mechanism such as, for example, a spring unit. One end of the rope is coupled with the output shaft (crankshaft) of the engine 12, while another end of the rope extends outwardly and a knob is attached thereto. When the operator quickly pulls the knob, the rope drives the output shaft of the engine 12 and the engine 12 starts accordingly.

The starting operation of the engine 12 with the recoil starter unit can be somewhat difficult for some people to accomplish because it may require a large amount of force to start the engine. The difficulty is related to the construction of the engine 12. The engine 12 has a combustion chamber defined by a piston and the force that the operator applies to the rope must be sufficient to move the piston against the repulsion force generated within the combustion chamber that occurs as the gases therein are compressed. The difficulty of performing the starting operation increases as the volume of the combustion chamber increases.

The decompression mechanism 200 is provided to reduce the repulsion force. For instance, the decompression mechanism can lift either one of an intake or exhaust valve or both of them to decompress the combustion chamber during the starting operation.

Figure 20:
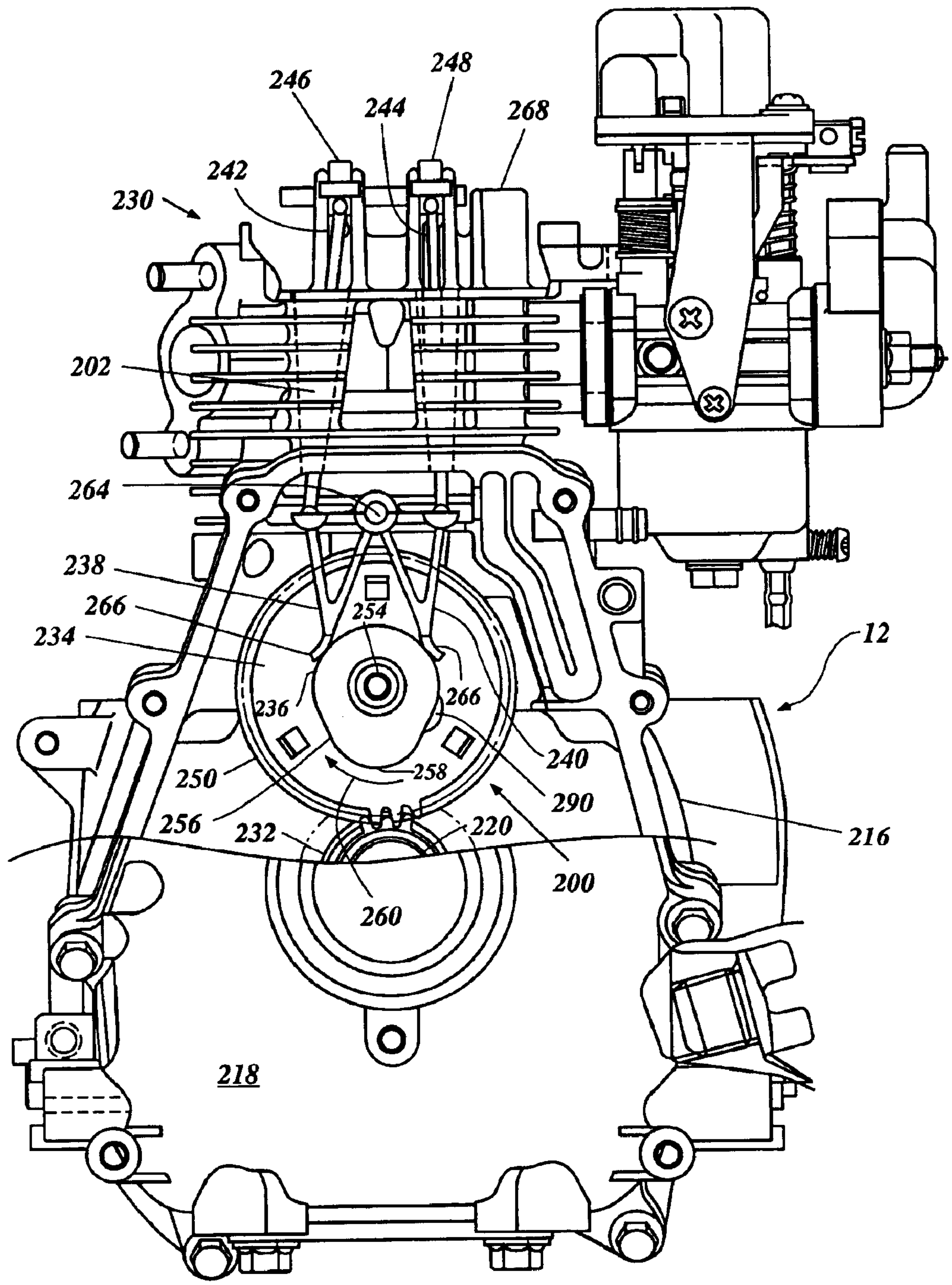
FIG. 20 is a front elevational view of the engine that can be incorporated in either one of the foregoing engine-driven generators, wherein the engine is partially illustrated in section.
Figure 21:
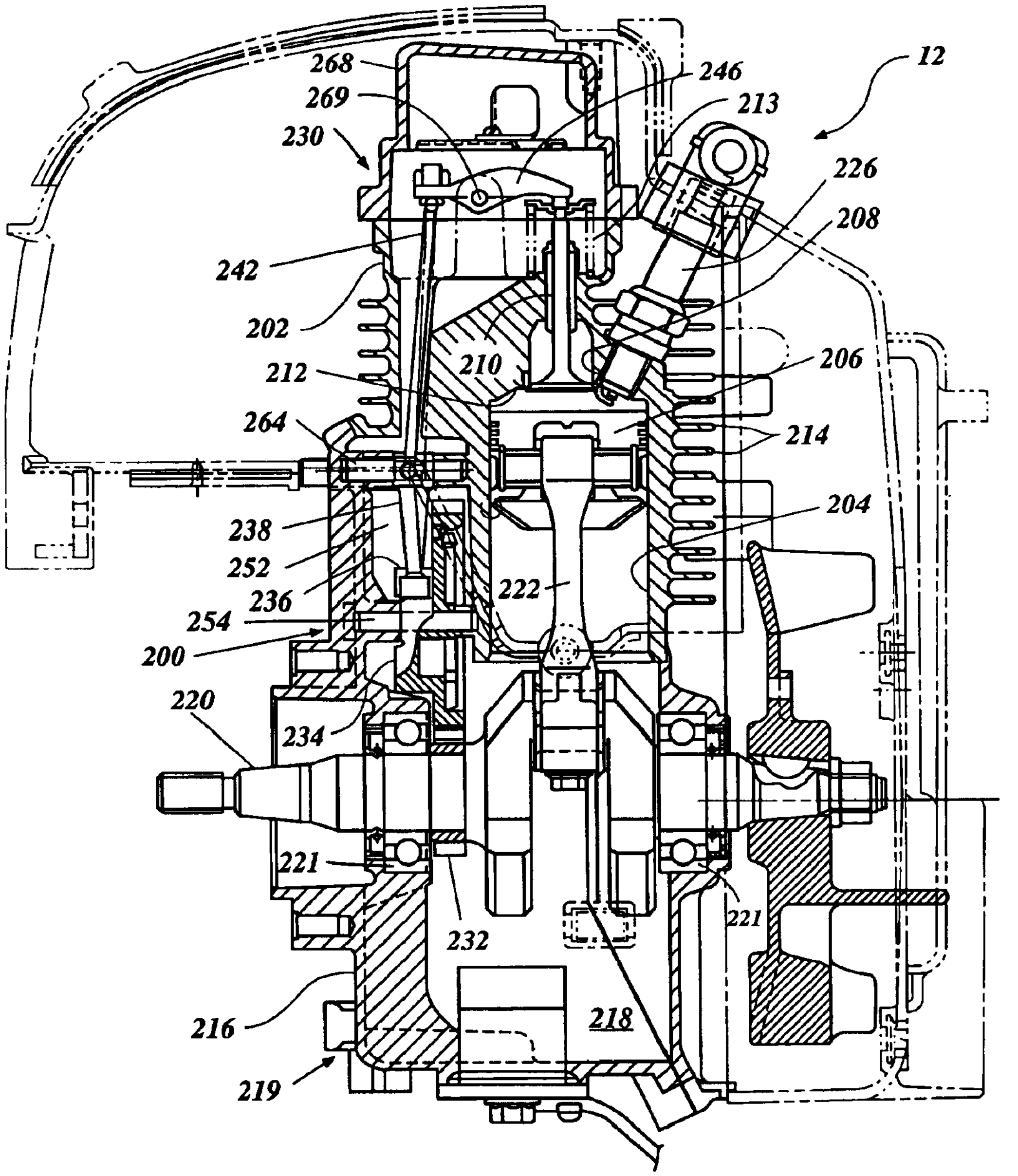
FIG. 21 is a cross-sectional, side elevational view of the engine of FIG. 20.

With reference to FIGS. 20 and 21, the engine 12 is preferably a single cylinder, four cycle engine. A cylinder block 202 defines a cylinder bore 204. A piston 206 is reciprocally disposed within the cylinder bore 204. The cylinder block 202 also defines an intake port 208 and an exhaust port (not shown) opposite to the piston 206. The cylinder bore 204 communicates with both the intake port 208 and the exhaust port. An intake valve 210 and an exhaust valve extend through the intake port 208 and the exhaust port, respectively. The cylinder block 202, the piston 206, the intake valve 210 and the exhaust valve together form a combustion chamber 212. The intake valve 210 and the exhaust valve selectively connect the intake port 208 and the exhaust port, respectively, with the combustion chamber 212.

Bias springs 213 normally urge the intake valve 210 and the exhaust valve toward the respective closed position. At the closed position, the intake valve 210 or the exhaust valve closes the intake port 208 or the exhaust port, respectively, relative to the combustion chamber 212 and thus the intake port 208 or the exhaust port does not communicate with the combustion chamber 212. At an open position, the intake valve 210 or the exhaust valve opens the intake port 208 or the exhaust port, respectively, toward the combustion chamber 212 and thus the intake port 208 or the exhaust port communicates with the combustion chamber 212.

The illustrated cylinder block 202 defines a plurality of fins 214 extending outwardly from an outer surface of the cylinder block 202 to radiate heat.

A crankcase member 216 is coupled with the cylinder block 202 to form a crankcase chamber 218 therebetween. The cylinder block 202 and the crankcase member 216 together form an engine block 219. A crankshaft 220 is supported at bearing portions of the crankcase member 216 for rotation by bearings 221. The crankshaft 220 forms the output shaft of the engine 12. The crankshaft 220 is connected with the piston 206 by a connecting rod 222 such that the crankshaft 220 rotates when the piston 206 reciprocates within the cylinder bore 204.

The intake port 208 and the intake valve 210 form part of the air intake system through which the air is drawn to the combustion chamber 212. The throttle valve is disposed in the intake system to regulate the air amount. The carburetor is also provided at a portion of the intake system to supply the fuel into the intake system as described above. The air and the fuel can enter the combustion chamber 212 when the intake valve 210 connects the intake port 208 with the combustion chamber 212. The air/fuel charge is thus formed within the combustion chamber 212. Other types of charge formers (e.g., direct or port injection fuel injectors) can also be used.

The ignition system has an ignition plug 226 that ignites the air/fuel charge within the combustion chamber 212. The air/fuel charge burns and the volume thereof abruptly expands to move the piston 206 toward the crankcase chamber 218. The reciprocal movement of the piston 206 rotates the crankshaft 220 through the connecting rod 222. The burnt charge, i.e., the exhaust gases, are routed to the external location through the exhaust system that comprises the exhaust valve and the exhaust port.

The engine 12 incorporates a valve actuation mechanism 230. The mechanism 230 comprises a drive gear 232, a driven gear 234, a cam 236, intake and exhaust cam followers 238, 240, intake and exhaust push rods 242, 244 and intake and exhaust rocker arms 246, 248.

The drive gear 232 is disposed next to one of the bearings 221 and is coupled to the crankshaft 220 for rotation with the crankshaft 220. The driven gear 234 has a peripheral section 250 (FIGS. 22–24) where gear teeth extend outwardly. The gear teeth mesh with gear teeth of the drive gear 232. The driven gear 234 has an outer diameter that is twice as large as the outer diameter of the drive gear 232. Additionally, the number of gear teeth of the driven gear 234 is twice the number of the gear teeth of the drive gear 232.

With reference back to FIGS. 20, 21, a portion of the cylinder block 202 is partly nested in the crankcase member 216. An outer surface of the cylinder block 202 and an inner surface of the crankcase member 216 together define a space 252. The driven gear 234 is positioned in this space 252. Also, the outer surface of the cylinder block 202 and the inner surface of the crankcase member 216 together define a lower support that supports a center shaft 254 of the driven gear 234. The driven gear 234 is rotatable about the center shaft 254. Alternatively, the center shaft 254 can rotate together with the driven gear 234 relative to the cylinder block 202 and the crankcase member 216.

The illustrated cam 236 has a generally oval shape and is unitarily formed on the driven gear 234 as a cam section of the driven gear 234. The center shaft 254 extends through a generally center portion of the cam section 236. The cam section 236 defines a side surface 256 and a cam lobe 258 extends from the side surface 256. The cam lobe 258 moves around the center shaft 254 clockwise as indicated by the arrow 260 of FIG. 20 when the cam section 236 rotates.

The intake and exhaust cam followers 238, 240 are generally V-shaped members. The outer surface of the cylinder block 202 and the inner surface of the crankcase member 216 together define an upper support that supports a cam follower shaft 264. The cam followers 238, 240 are swingable about the shaft 264 at one end of the V-shape. That is, each lower end 266 of the cam followers 238, 240 abuts on a side surface 256 of the cam section 236 and each cam follower 238, 240 swings about the shaft 264 when the cam section 236 rotates and the cam lobe 258 meets the lower end 266 of the cam follower 238, 240.

Another end of the V-shape of the intake cam follower 238 holds a lower end of the intake push rod 242. Also, another end of the V-shape of the exhaust cam follower 240 holds a lower end of the exhaust push rod 244. Upper ends of the intake and exhaust push rods 242, 244 are each coupled with a first end of the intake and exhaust rocker arms 246, 248, respectively, such that the upper ends thereof are not rigidly affixed to the rocker arms 246, 248 but can push respective first ends of the rocker arms 246, 248 upwardly. The rocker arms 246, 248 are swingably supported atop the cylinder block 202 by rocker arm shafts 269. Each rocker arm 246, 248 has a second end that is coupled with the top of the intake valve 210 and the exhaust valve respectively. The respective rocker arms 246, 248 swing about the rocker arm shafts 269 when the push rods 242, 244 push the first end thereof The second ends of the rocker arms 246, 248 then push the respective top ends of the intake valve 210 and the exhaust valve when the rocker arms 246, 248 swing. The rocker arms 246, 248 preferably are covered by a cylinder head cover 268.

The drive gear 232 rotates together with the crankshaft 220. The drive gear 232 drives the driven gear 234. The driven gear 234 rotates once when the driven gear 232 and the crankshaft 220 rotate twice. The cam section 236 rotates as a portion of the driven gear 234. The cam lobe 258 lifts the intake cam follower 238 first and then lifts the exhaust cam follower 240. The intake push rod 242 and then the exhaust push rod 244 push the respective rocker arms 246, 248 in this sequence. Then, the respective rocker arms 246, 248, one after another, push the intake valve 210 and the exhaust valve against the bias force of the springs 213. The intake valve 210 and the exhaust valve thus move to each open position (connecting position) to allow the air and fuel to enter the combustion chamber 212. The rocker arms 246, 248, the push rods 242, 244 and the cam followers 238, 240 return to their initial positions when the cam lobe 258 has passed over the cam followers 238, 240. The intake valve 210 and the exhaust valve thus return to their closed position (disconnecting position) to inhibit the air and fuel from entering the combustion chamber 212. The intake valve 210 and the exhaust valve move to each open position once every two rotations of the crankshaft 220.

With continued reference to FIGS. 20 and 21 and additional reference to FIGS. 22–26, the decompression mechanism 200 is further described below.

Figure 24:
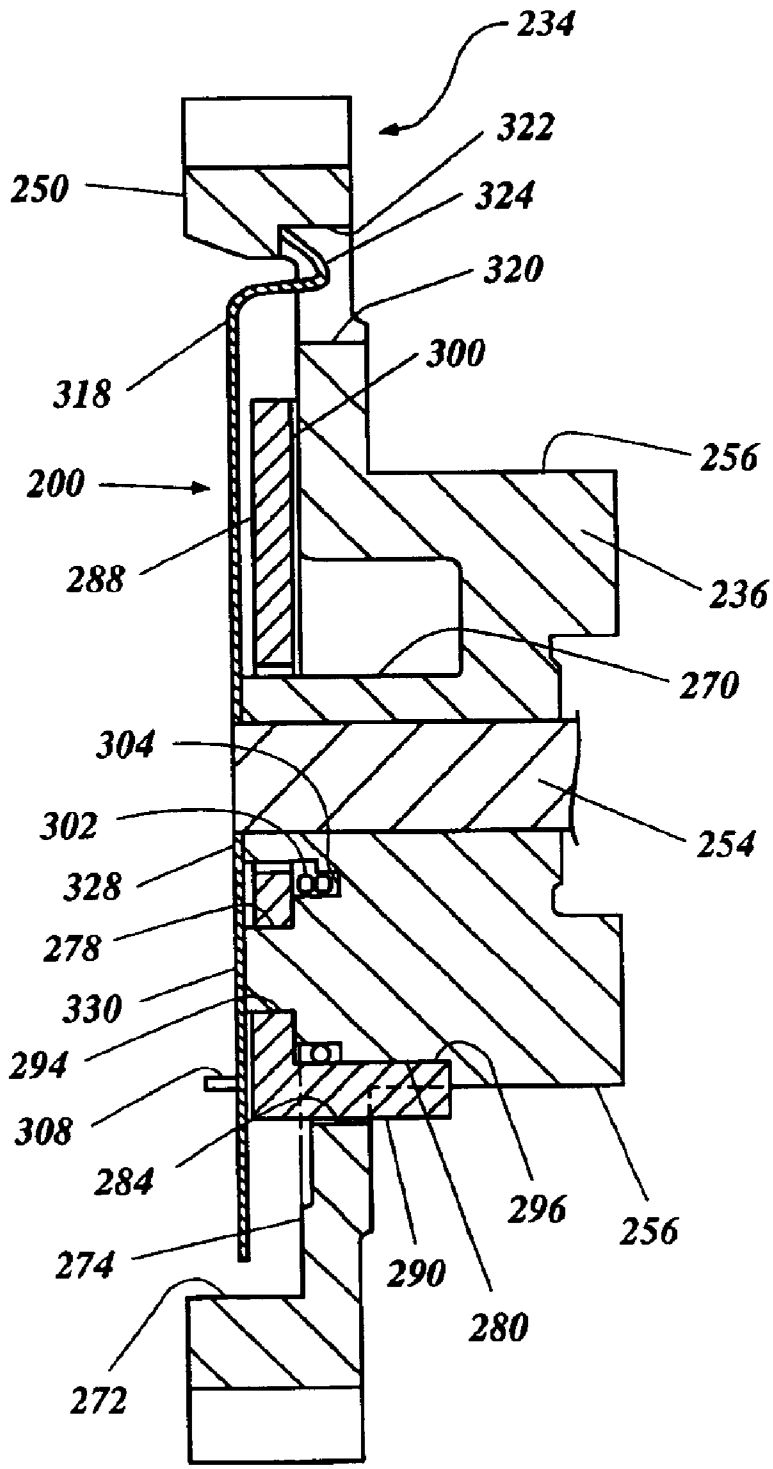
FIG. 24 is a cross-sectional side view of the driven gear taken along the line 24—24 of FIG. 23 with the decompression mechanism illustrated as placed in the initial position.

The driven gear 234 has a boss 270 defined at the center thereof The illustrated boss 270 is rotatably mounted on the center shaft 254. A circular recess 272 is coaxially defined around the boss 270. In other words, an intermediate section 274 comprising the circular recess 272 is defined between the boss 270 and the peripheral section 250. The intermediate section 274 is generally flat and, as best seen in FIG. 24, a wall thickness of the center area 274 is thinner than the thickness of the boss 270 and the thickness of the peripheral area 250. The cam section 236 is generally formed on the side of the driven gear 234 opposite the recess 272, which is defined by the intermediate section 274 and the peripheral section 250. The intermediate section 274 extends beyond the cam section 236 to the peripheral section 250.

A portion of the intermediate section 274 protrudes to form a pivot pin 278 extending toward a portion of the inner surface of the crankcase member 216. The pivot pin 278 is disposed near the boss 270 and is offset from a center axis of the driven gear 234. While the pivot pin 278 is integral with the intermediate section 274 in the illustrated embodiment, the pivot pin 278 can be formed separately and then assembled with the intermediate section.

A portion of the side surface 256 of the cam section 236, which is located next to the pivot pin 278, is partially and slightly recessed toward the pivot pin 278 to form an arcuate recess 280. The arcuate recess 280 has a curvature that preferably forms a semicircular arc. The arcuate recess 280 is coaxially formed around the pivot pin 278 and has an outer diameter that is larger than the outer diameter of the pivot pin 278.

Figure 22:
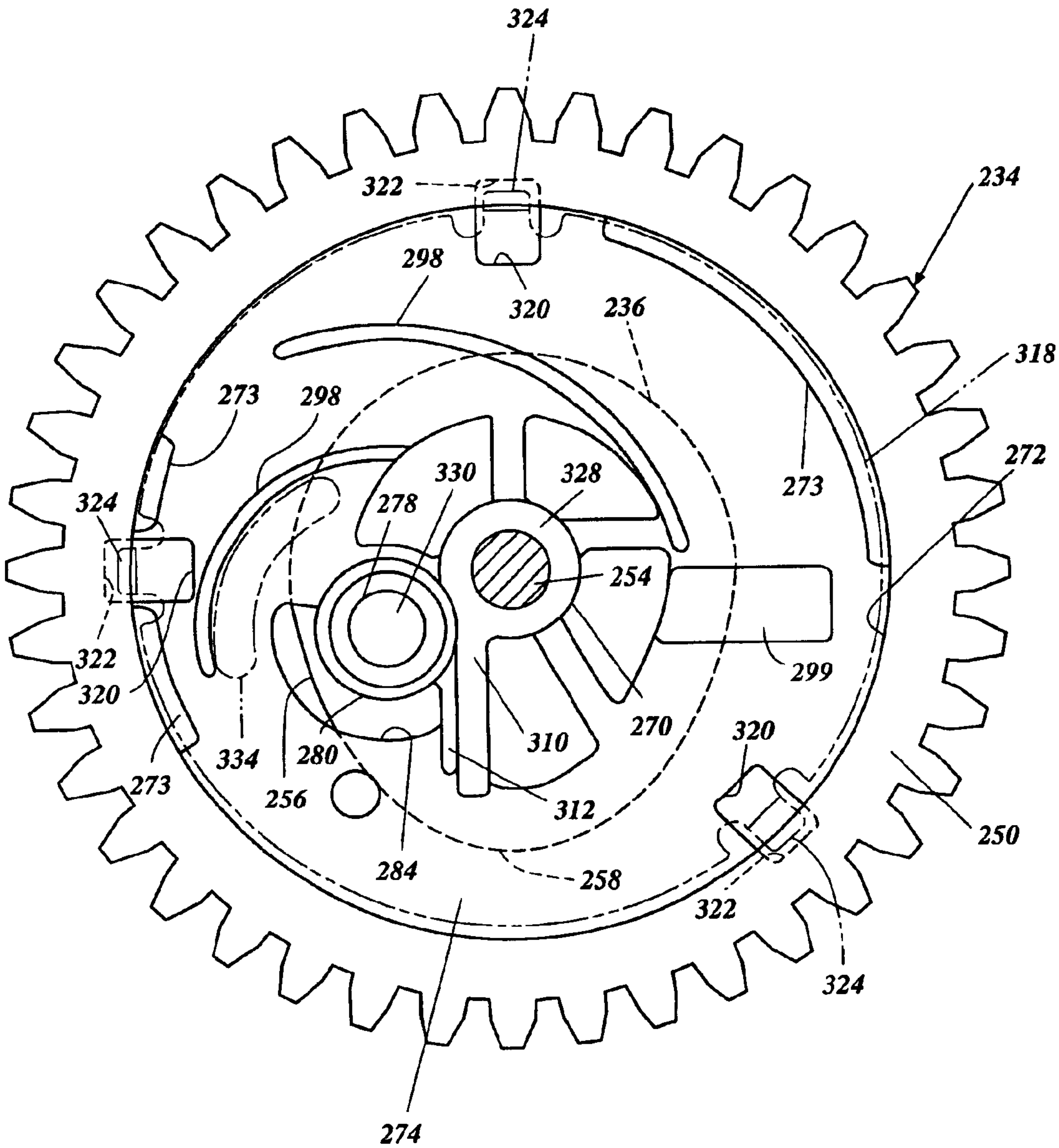
FIG. 22 is a rear view of a driven gear of the engine in which a decompression mechanism is only partially shown.

The arcuate recess 280 constitutes a portion of a slot 284 that is defined in the intermediate section 274. In other words, the arcuate recess 280 forms one side of the slot 284. Another side of the slot 284, opposite the arcuate recess 280, also preferably is arcuately configured and is coaxially formed around the pivot pin 278. With reference to FIG. 22, a portion of the side surface 256 of the cam section 236 can be seen through the slot 284.

Figure 25:
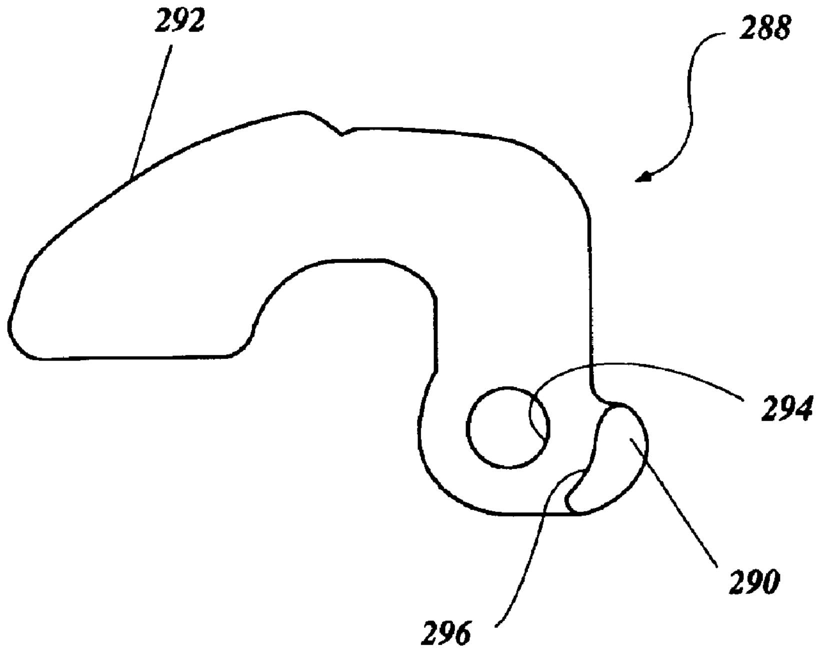
FIG. 25 is a front view of a decompression lever of the decompression mechanism.
Figure 26:
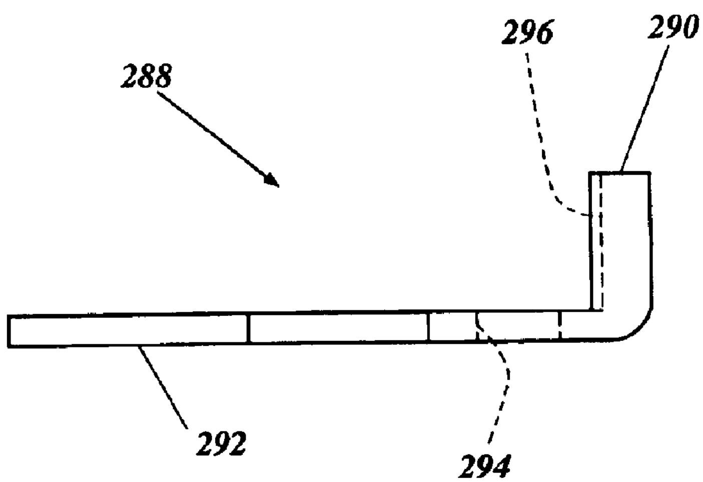
FIG. 26 is a bottom view of the decompression lever.

A decompression lever 288 is journaled on the pivot pin 278 for pivotal movement. The decompression lever 288 is thus located on a side of the intermediate section 274 that is opposite to the cam section 236. With reference to FIGS. 25 and 26, the decompression lever 288 is generally configured as a hook-shape and is thinner than the depth D of the recess 272. The lever 288 comprises a lifter section 290 and a weight section 292. An opening 294 is defined adjacent to the lifter section 290. The pivot pin 278 extends through the opening 294.

The weight section 292 extends opposite the lifter section 290 and defines the major part by mass of the hook configuration. An outer surface of the weight section 292 preferably has a curvature that corresponds to the peripheral section 250 of the driven gear 234.

The lifter section 290 is bent generally normal to the weight section 292. The lifter section 290 has an arcuate surface 296 that faces the arcuate recess 280 of the cam section 236. The arcuate surface 296 has a curvature that preferably forms a semicircular arc. An inner diameter of the arcuate surface 296 is slightly larger than the outer diameter of arcuate recess 280. Also, the slot 284 is formed larger than the lifter section 290. Thus, the lifter section 290 is movable along the cam section 236 within the slot 284 when the decompression lever 288 pivots about the pivot pin 278. The lifter section 290 always leans upon the side surface 256 of the cam section 236 wherever the lifter section 290 is positioned.

The intermediate section 274 preferably defines ribs 298 that support the decompression lever 288. The illustrated ribs 298 are arcuate and are generally coaxially formed around the pivot pin 278. A side surface 300 (FIG. 24) of the decompression lever 288 can lean against the ribs 298 as the decompression lever 288 slidably moves over the ribs 298.

The illustrated decompression lever 288 preferably is made of a flat sheet metal. An original lever member, which has the lifter section 290 extending straight relative to the weight section 292, is punched out from the sheet metal. The opening 294 is simultaneously made in the punching process. The original lever member is then pressed so that the lifter section 290 is bent from a portion of the original lever. Afterwards, at least the arcuate surface 296 is finished in a machining process to form the desired curvature. Another surface of the lifter section 290 opposite to the arcuate surface 296 can be shaped arcuately, if necessary. Alternatively, the decompression lever 288 can be produced by sintering, forging, casting, machining or other conventional methods.

A bias spring 302 urges the decompression lever 288 toward an initial position. The initial position is defined by the bias spring 302 urging the weight section 292 of the decompression lever 288 against an abutment portion 299 that extends from the intermediate section 274 into the circular recess 272. The solid lines of FIG. 23, which illustrate the bias spring 302, show that the lever 288 is in the initial position. In this initial position, the decompression lever 288 is generally positioned about the boss 270 of the driven gear 234.

The bias spring 302 is preferably a coil spring. A coiled portion 303 of the bias spring 302 is disposed in a circular groove 304 (FIG. 24) that is formed adjacent to the pivot pin 278 and coaxially with the pivot pin 278. The groove 304 has a larger diameter than the pivot pin 278. The bias spring 302 also has two straight extending end portions 306, 308. An embankment 310 extends generally radially from the boss 270 adjacent to the pivot pin 278 and the slot 284. A groove 312 extending from the circular groove 304 is defined along the embankment 310 and generally between the embankment 310 and the slot 284. The end portion 306 of the spring 302 is positioned in the groove 312 such that the end portion 306 acts against the embankment 310. The other end portion 308 is bent and is hooked on an engagement surface 314 of the decompression lever 288 which is located next to the lifter section 290. Thus, the spring 302 normally biases the decompression lever 288 in the initial position.

A cover member 318 preferably covers the decompression mechanism 200. The illustrated cover member 318 is generally circular and flat. The cover member 318 has a diameter slightly smaller than the diameter of the recess 272. Preferably, the driven gear 234 defines flanges 273 that extend from the periphery section 250 to the intermediate section 274 and hold corresponding portions of the cover member 318. Also, the driven gear 234 preferably defines three openings 320 at locations between the intermediate section 274 and the periphery section 250 such that steps 322 are formed at outer edges of the openings 320 in the periphery section 250. The cover member 318 has three hooks 324 that are inserted into the respective openings 320. A distal end of each hook 324 engages each step 322. The cover member 318 is thus affixed to the driven gear 234.

The cover member 318 preferably abuts a terminal end 328 of the boss 270 and a terminal end 330 of the pivot pin 278. Accordingly, the decompression lever 288 and the bias spring 302 are inhibited from slipping off of the pivot pin 278 and slipping out of the grooves 304, 312, respectively. On the other hand, the cover member 318 is preferably spaced apart from the decompression lever 288 so as to allow the lever 288 to move freely.

The cover member 318 preferably defines an arcuate slot 334 (FIG. 23) that generally extends to the side of one of the ribs 298. The hooked end of the bias spring 302 can thus move in the slot 334 when the decompression lever 288 pivots.

Figure 23:
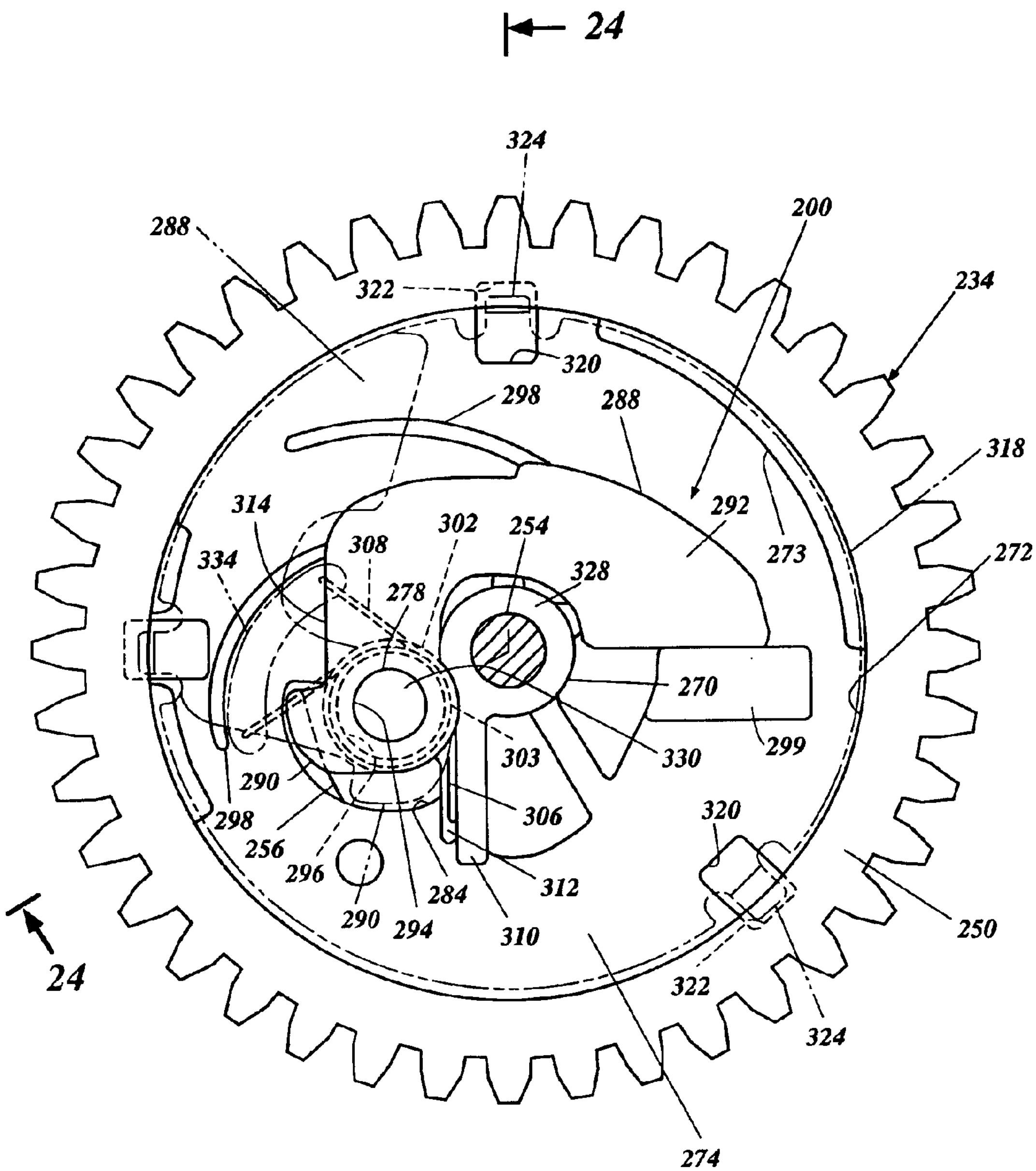
FIG. 23 is a rear view of the driven gear, wherein the decompression mechanism is fully shown, wherein an initial position of the decompression mechanism is illustrated in solid lines, and wherein a position of the decompression mechanism after the engine is started is illustrated in phantom lines.

The decompression lever 288 rests in the initial position, illustrated by the actual line of FIG. 23 and also illustrated in FIG. 24, because the bias spring 302 urges the lever 288 to this position. The weight section 292 is generally positioned opposite the pivot pin 278 relative to the boss 270. The lifter section 290 of the decompression lever 288 protrudes from the side surface 256 of the cam section 236 in this position as shown in FIG. 20. In other words, the thickness of the lifter section 290 acts to add thickness to a part of the cam section 236, i.e., it increases the cam profile. In the illustrated arrangement, the lifter section 290 preferably extends from a specific portion of the cam section 236 such that the lifter section 290 follows the cam section lobe 258 with a slight delay when the cam section 236 rotates.

The operator pulls the rope of the recoil starter unit. The drive gear 232 rotates together with the crankshaft 220 and drives the driven gear 234. The decompression lever 288 remains in the initial position because the rotational speed of the driven gear 234 under this condition is relatively slow and does not generate any centrifugal force that will cause the lever 288 to move. The cam section 236, which is unitarily formed with the driven gear 234, rotates and the lifter section 290 attached to the cam section 236 lifts the cam section followers 238, 240. The intake valve 210 and the exhaust valve are thus opened through the valve actuation mechanism 230 and the combustion chamber 212 is decompressed. More specifically, because the lifter section 290 is attached at the specific portion of the cam section 236 as described above, the intake valve 210 can stay open for a time after the normal end timing of the intake stroke of the engine 12 has passed. Similarly, the exhaust valve can stay open for a time after the normal end timing of the exhaust stroke of the engine 12 has passed. Accordingly, the operator can more easily operate the recoil unit.

The engine 12 then starts operating. The drive gear 234, together with the crankshaft 220, rotates at a higher speed and drives the driven gear 234. The driven gear 234 also rotates at a higher speed. The resultant centrifugal force on the weight section 288 throws the weight section 288 toward the peripheral area 250 thereby rotating the decompression lever 288 about the pivot pin 278, as is indicated by the phantom line of the lever 288 of FIG. 23. The lifter section 290 is now retracted into the recess 280 and under the cam section 236 so that it no longer protrudes beyond the cam surface 256 and lifts the cam followers 238, 240. Accordingly, the valve actuation mechanism 230 actuates the intake valve 210 and the exhaust valve at normal times and for normal durations.

As thus described, the illustrated decompression lever 288 has a simple configuration and is generally flat such that the thickness thereof is generally equal at every portion. The lever 288 can thus be made from a sheet metal to reduce the manufacturing cost of the decompression mechanism 200 in comparison to prior decompression devices.

The lift section 290 leans on the arcuate recess 280 of the cam section 236 in the decompression operation. In other words, the cam section 236 supports the lifter section 290 when the lifter section 290 lifts the cam followers 238, 240. Thus, the lifter section 290 and the lever 288 will experience less wear by the repeated collisions with the cam followers 238, 240 and can have a long life. Accordingly, the decompression lever 288, particularly the lifter section 290 thereof, can be thinner and the lever 288 can be lighter.

In addition, the pivot pin 278 does not need to support the lifter section 290 because the cam section supports the lifter section 290. Accordingly, with the present embodiment the size of the pivot pin 278 can be reduced.

In some arrangements, for example, the lifter section may lift either the intake cam follower or the exhaust cam follower. Additionally, two lifter sections can be formed on a single decompression lever. Also, two decompression levers can be provided to separately lift the respective cam followers.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. It should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A power supply comprising an internal combustion engine, a generator driven by the engine to generate a first AC power, a rectifier that rectifies the first AC power to a first DC power, an inverter that receives the first DC power as a first input and that generates a second AC power, an electrical storage device that stores electrical energy to supply a second DC power, a DC/DC converter that converts the second DC power to a third DC power, the third DC power provided as a second input to the inverter, the inverter also converting the third DC power to the second AC power, and a controller that controls at least the rectifier and the DC/DC converter, the controller selectively enabling one of the rectifier and the DC/DC converter to provide one of the first DC power and the third DC power, respectively, to the inverter, or selectively enabling the rectifier and the DC/DC converter to provide the first and third DC powers to the inverter at the same time, wherein the controller monitors the second AC power, the controller enabling the rectifier and the DC/DC converter to provide the first and third DC powers to the inverter when the second AC power is greater than a preset magnitude.

2. The power supply as set forth in claim 1, wherein the controller monitors a current of the second AC power.

3. The power supply as set forth in claim 2, wherein the controller additionally monitors an increase rate of the current, the controller enabling the rectifier and the DC/DC converter to provide the first and third DC powers to the inverter when the increase rate of the current is greater than a preset increase rate.

4. The power supply as set forth in claim 2, wherein the controller additionally monitors a voltage of the first DC power, the controller enabling the rectifier and the DC/DC converter to provide the first and third DC powers when the current is greater than a preset magnitude and the voltage is less than a preset voltage.

5. The power supply as set forth in claim 1, additionally comprising a switch to select either a first control mode or a second control mode, one of the rectifier and the DC/DC converter providing one of the first and third DC powers, respectively, to the inverter when the switch is positioned in the first control mode, and both of the rectifier and the DC/DC converter providing respective DC powers when the switch is positioned in the second control mode.

6. The power supply as set forth in claim 5, further comprising a second switch to select either the rectifier or the DC/DC converter under the first control mode.

7. The power supply as set forth in claim 6, further comprising a third switch to select either a first engine operating mode or a second engine operating mode, the controller monitoring the second AC power, the controller controlling the engine such that an engine speed changes along with a change of the second AC power when the third switch is positioned in the first engine operating mode, the controller controlling the engine such that the engine speed is generally constant when the third switch is positioned in the second engine operating mode.

8. The power supply as set forth in claim 1, additionally comprising a switch to select either a first engine operating mode or second engine operating mode, the controller monitoring the second AC power, the controller controlling the engine such that an engine speed changes along with a change of the second AC power when the switch is positioned in the first engine operating mode, the controller controlling the engine such that the engine speed is generally constant when the switch is positioned in the second engine operating mode.

9. The power supply as set forth in claim 8, wherein the controller incorporates at least one control map of engine speed versus current of the second AC power, the controller monitors the current of the second AC power, and the controller controls the engine speed in accordance with a change of the current using said control map.

10. The power supply as set forth in claim 1, wherein the generator or the engine incorporates a charge coil that charges the electrical storage device.

11. The power supply as set forth in claim 1, wherein the electrical storage device includes a battery.

12. The power supply as set forth in claim 1, wherein the electrical storage device includes a double-layered capacitor.

13. The power supply as set forth in claim 1, additionally comprising at least a second generator, the generators generating respective first AC powers that are different in magnitude with respect to each other, and additionally comprising at least a second rectifier, each rectifier receiving a respective one of the first AC power and producing a respective rectified DC power at a respective rectifier output, the rectifier outputs being connected in series to provide the first DC power as a sum of the respective rectified DC powers.

14. The power supply as set forth in claim 1, additionally comprising a housing at least enclosing the engine and the generator, a temperature sensor detecting a temperature inside of the housing, the controller controlling a speed of the engine based upon an output signal of the temperature sensor, the controller increasing engine speed when the temperature increases.

15. A control method for a power supply, comprising monitoring an AC power from an inverter, determining whether the AC power is greater than a preset magnitude, and selectively enabling a rectifier and a DC/DC converter to provide respective DC powers to the inverter when the AC power is greater than the preset magnitude.

16. The control method as set forth in claim 15, additionally comprising determining whether a switch is placed in a first position corresponding to a first control mode or in a second position corresponding to a second control mode, enabling one of the rectifier and the DC/DC converter to provide respective DC power to the inverter if the switch is placed in the first position, and enabling the rectifier and the DC/DC converter to provide respective DC powers to the inverter if the switch is placed in the second position.

17. The control method as set forth in claim 16, wherein the rectifier rectifies a second AC power generated by a generator driven by an engine, the method further comprising determining whether a second switch is placed in a first position corresponding to a first engine operating mode or the second switch is placed in a second position corresponding to a second engine operating mode, controlling the engine such that an engine speed changes along with a change of the first AC power if the second switch is placed in the first position, and controlling the engine such that the engine speed is generally constant if the second switch is placed in the second position.

18. The control method as set forth in claim 15, wherein the rectifier rectifies a second AC power generated by a generator driven by an engine, the method further comprising determining whether a switch is placed in a first position corresponding to a first engine operating mode or the switch is placed in a second position corresponding to a second engine operating mode, controlling the engine such that an engine speed changes along with a change of the first AC power if the switch is placed in the first position, and controlling the engine such that the engine speed is generally fixed if the switch is placed in the second position.

19. An engine-driven power supply, the power supply comprising:

an engine that operates at a variable engine speed, the engine having a power output;

a first generator coupled to the power output of the engine, the first generator generating a first AC voltage having a first magnitude characteristic in response to variations in the engine speed;

a second generator coupled to the power output of the engine, the second generator generating a second AC voltage having a second magnitude characteristic in response to variations in the engine speed;

a first rectifier having an input that receives the first AC voltage and having an output that provides a first DC voltage;

a second rectifier having an input that receives the second AC voltage and having an output that provides a second DC voltage, the output of the second rectifier connected in series with the output of the first rectifier to superimpose the first DC voltage and the second DC voltage to provide a composite DC voltage having a composite magnitude characteristic in response to engine speed; and a DC-to-AC conversion unit having an input that receives the composite DC voltage and having an output that generates an AC output voltage responsive to the magnitude of the composite DC voltage.

20. The power supply as defined in claim 19, further comprising a voltage stabilization circuit that stabilizes at least the first DC voltage such that the composite DC voltage increases only to a selected magnitude as the engine speed increases to a selected engine speed, and such that the composite DC voltage does not increase as the engine speed increases above the selected engine speed.

21. The power supply as defined in claim 20, further comprising:

a filter circuit coupled to the output of the DC-to-AC conversion unit, the filter circuit reducing harmonic components from the third AC voltage, the filter circuit generating a control voltage responsive to the third AC voltage; and a control circuit coupled to receive the control voltage from the filter circuit, the control circuit controlling the voltage stabilization circuit in response to the control voltage.

22. The power supply as defined in claim 20, wherein:

the first AC voltage generated by the first generator is greater than the AC voltage generated by the second generator; and the voltage stabilization circuit stabilizes the first DC voltage provided by the first rectifier.

23. The power supply as defined in claim 19, further comprising a filter circuit coupled to the output of the DC-to-AC conversion unit, the filter circuit reducing harmonic components from the third AC voltage.

24. The power supply as set forth in claim 1, additionally comprising a switch operated by an operator to select either a first control mode or a second control mode, one of the rectifier and the DC/DC converter providing one of the first and third DC powers, respectively, to the inverter when the switch is positioned in the first control mode, and both of the rectifier and the DC/DC converter providing respective DC powers when the switch is positioned in the second control mode.

25. The power supply as set forth in claim 24, further comprising a second switch operated by an operator to select either the rectifier or the DC/DC converter under the first control mode.

26. The power supply as set forth in claim 25, further comprising a third switch operated by an operator to select either a first engine operating mode or a second engine operating mode, the controller monitoring the second AC power, the controller controlling the engine such that an engine speed changes along with a change of the second AC power when the third switch is positioned in the first engine operating mode, the controller controlling the engine such that the engine speed is generally constant when the third switch is positioned in the second engine operating mode.

27. The power supply as set forth in claim 1, additionally comprising a switch operated by an operator to select either a first engine operating mode or second engine operating mode, the controller monitoring the second AC power, the controller controlling the engine such that an engine speed changes along with a change of the second AC power when the switch is positioned in the first engine operating mode, the controller controlling the engine such that the engine speed is generally constant when the switch is positioned in the second engine operating mode.

* * * * *

UNITED STATES PATENT AND TRADEMARK OFFICE

CERTIFICATE OF CORRECTION

PATENT NO. : 6,943,531 B2 Page 1 of 1
DATED : September 13, 2005
INVENTOR(S) : M. Fukaya It is certified that error appears in the above-identified patent and that said Letters Patent is hereby corrected as shown below:

Column 9,
Line 36, delete "14" and insert -- 114 --.

Column 11,
Line 58, delete "S 11" and insert -- S11 --.

Column 13,
Line 46, after "turned off" insert -- . --.

Column 20,
Line 9, after "thereof" insert -- . --.

Column 24,
Line 20, after "thereof" insert -- . --.

Signed and Sealed this

Sixth Day of June, 2006

JON W. DUDAS
*Director of the United States Patent and Trademark Office*